(12) United States Patent
Chi et al.

(10) Patent No.: US 10,379,406 B2
(45) Date of Patent: Aug. 13, 2019

(54) DISPLAY PANEL

(71) Applicant: AU Optronics Corporation, Hsin-Chu (TW)

(72) Inventors: Yu-Min Chi, Hsin-Chu (TW); Sung-Yu Su, Hsin-Chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 0 days.

(21) Appl. No.: 15/697,570

(22) Filed: Sep. 7, 2017

(65) Prior Publication Data
US 2018/0113340 A1 Apr. 26, 2018

(30) Foreign Application Priority Data
Oct. 26, 2016 (TW) .............................. 105134542 A

(51) Int. Cl.
G02F 1/1343 (2006.01)
G09G 3/36 (2006.01)
G02F 1/1337 (2006.01)

(52) U.S. Cl.
CPC ...... *G02F 1/1343* (2013.01); *G02F 1/133707* (2013.01); *G02F 1/134309* (2013.01);
(Continued)

(58) Field of Classification Search
CPC ............. G02F 1/1343; G02F 1/133707; G02F 1/134309; G02F 2001/134345;
(Continued)

(56) References Cited

U.S. PATENT DOCUMENTS

2004/0263749 A1* 12/2004 Jeong ................ G02F 1/134363
349/141
2006/0164575 A1 7/2006 Su et al.
(Continued)

FOREIGN PATENT DOCUMENTS

CN 103412442 A 11/2013
CN 105652532 A 6/2016

OTHER PUBLICATIONS

China Patent Office "Office Action" dated Dec. 28, 2018, China.

Primary Examiner — Charles S Chang
(74) Attorney, Agent, or Firm — WPAT, PC

(57) ABSTRACT

A display panel includes a pair of substrates, a pixel electrode, a common electrode, a first transparent electrode, and a second transparent electrode. A plurality of sub pixels is defined on the pair of substrates. The first transparent electrode corresponds to at least one of the plurality of sub pixels. A vertical projection of the first transparent electrode, a vertical projection of a part of the pixel electrode of the sub pixel corresponding to the first transparent electrode, and a vertical projection of a part of the common electrode of the sub pixel corresponding to the first transparent electrode on the substrates are overlapped. The second transparent electrode corresponds to the corresponding sub pixel. A vertical projection of the second transparent electrode, a vertical projection of another part of the pixel electrode of the sub pixel corresponding to the second transparent electrode, and a vertical projection of another part of the common electrode of the sub pixel corresponding to the second transparent electrode on the substrates are overlapped. A gap exists between the first transparent electrode and the second transparent electrode.

19 Claims, 15 Drawing Sheets

(52) U.S. Cl.
CPC ......... *G09G 3/3688* (2013.01); *G09G 3/3696* (2013.01); *G02F 2001/134345* (2013.01); *G02F 2001/134372* (2013.01); *G09G 2300/0439* (2013.01)

(58) Field of Classification Search
CPC ...... G02F 2001/134372; G09G 3/3688; G09G 3/3696; G09G 2300/0439
USPC ......................................................... 349/141
See application file for complete search history.

(56) References Cited

U.S. PATENT DOCUMENTS

| | | |
|---|---|---|
| 2007/0046881 A1 | 3/2007 | Takei |
| 2008/0137018 A1* | 6/2008 | Lin .................... G02F 1/134363 349/141 |
| 2009/0135342 A1* | 5/2009 | Lee .................... G02F 1/134363 349/96 |
| 2014/0002762 A1* | 1/2014 | Iwata .................. G09G 3/3648 349/42 |
| 2017/0184885 A1* | 6/2017 | Chung ................. G02F 1/1323 |
| 2017/0192263 A1* | 7/2017 | Jiang ................... G02F 1/1323 |
| 2017/0255041 A1 | 9/2017 | Chang et al. |

\* cited by examiner

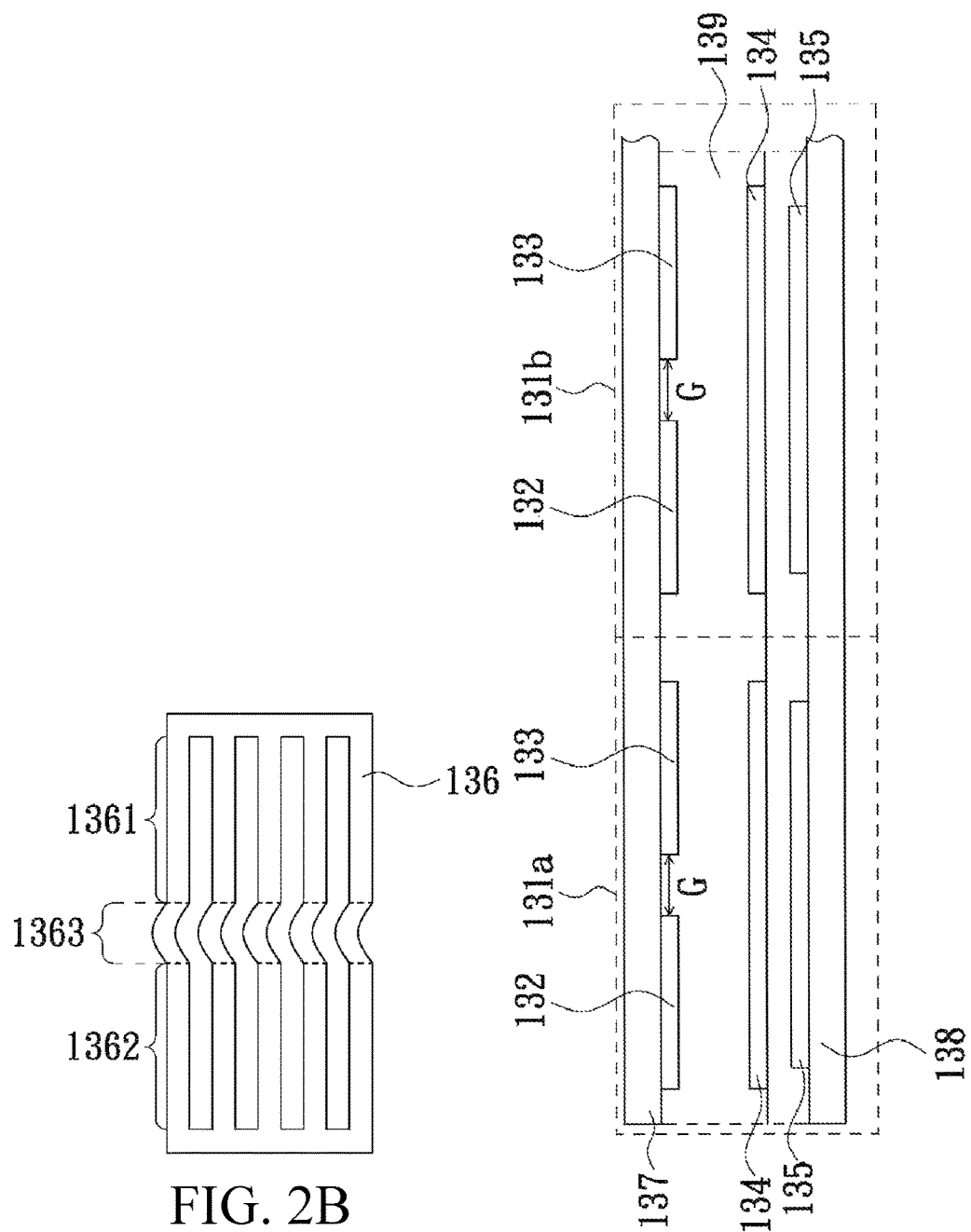

DISPLAY PANEL

BACKGROUND

Technical Field

The present disclosure relates to a display panel, and more particularly, to a display panel that can provide a display picture with even brightness.

Related Art

Liquid crystal display devices have advantages including a light weight, a small volume, energy conservation, and full color, and therefore are widely applied to electronic devices having different sizes such as televisions, notebook computers or tablet computers. With the development, maturization of related technologies and the improvement of quality of life, consumers have gradually increasing requirements of liquid crystal display devices. For example, consumers require better display effects of display pictures, larger display ranges or more effective energy conservation and power saving. Uneven brightness of a display picture not only affects a display effect of the display picture, but also easily affects viewing experience of a user. Therefore, how to effectively mitigate uneven brightness of a display picture of a liquid crystal display device is a crucially important subject at present.

SUMMARY

The present disclosure provides an embodiment of a display panel, comprising a pair of substrates, a birefringent medium layer sandwiched between the pair of substrates, a pixel electrode, a common electrode, a first transparent electrode, and a second transparent electrode. A plurality of sub pixels is defined on the pair of substrates. The pixel electrode is disposed on an inner surface of one of the pair of substrates of each sub pixel, the common electrode is disposed on the inner surface of one of the pair of substrates of each sub pixel, and at least one of the pixel electrode and the common electrode has a plurality of branches. The first transparent electrode is disposed on an inner surface of the other one of the pair of substrates, wherein the first transparent electrode corresponds to at least one of the plurality of sub pixels, a vertical projection of the first transparent electrode, and a vertical projection of a part of the pixel electrode of the sub pixel corresponding to the first transparent electrode, and a vertical projection of a part of the common electrode of the sub pixel corresponding to the first transparent electrode on the substrates are overlapped. The second transparent electrode is disposed on the inner surface of the other one of the pair of substrates, wherein the second transparent electrode corresponds to the corresponding sub pixel, and a vertical projection of the second transparent electrode, a vertical projection of another part of the pixel electrode of the sub pixel corresponding to the second transparent electrode, and a vertical projection of another part of the common electrode of the sub pixel corresponding to the second transparent electrode on the substrates are overlapped. A gap exists between the first transparent electrode and the second transparent electrode, so that the first transparent electrode and the second transparent electrode are separated from each other.

The present disclosure further provides another embodiment of a display panel, comprising: a pair of substrates, a birefringent medium layer sandwiched between the pair of substrates, a pixel electrode, a common electrode, a first transparent electrode, and a second transparent electrode. A plurality of sub pixels is defined on the pair of substrates, and is at least arranged into a first row and a second row. The pixel electrode is disposed on an inner surface of one of the pair of substrates of each sub pixel, and the common electrode is disposed on the inner surface of one of the pair of substrates of each sub pixel, and at least one of the pixel electrode and the common electrode has a plurality of branches. The first transparent electrode is disposed on an inner surface of the other one of the pair of substrates, wherein the first transparent electrode corresponds to a part of the first row of the sub pixels, and a vertical projection of the first transparent electrode, a vertical projection of the pixel electrode of the sub pixel that corresponds to the first transparent electrode and is located in the first row, and a vertical projection of the common electrode of the sub pixel corresponding to the first transparent electrode on the substrates are overlapped. The second transparent electrode is disposed on the inner surface of the other one of the pair of substrates, wherein the second transparent electrode corresponds to a part of the second row of the sub pixels, a vertical projection of the second transparent electrode, a vertical projection of the pixel electrode of the sub pixel that corresponds to the second transparent electrode and is located in the second row, and a vertical projection of the common electrode of the sub pixel corresponding to the second transparent electrode on the substrates are overlapped. A gap exists between the first transparent electrode and the second transparent electrode, so that the first transparent electrode and the second transparent electrode are separated from each other, wherein the pixel electrodes in any two adjacent sub pixels have opposite polarities.

In order to make the aforementioned and other objectives, features, and advantages of the present disclosure comprehensible, preferred embodiments accompanied with figures are described in detail below.

BRIEF DESCRIPTION OF THE DRAWINGS

FIG. 2B is a schematic view illustrating a first electrode according to the embodiment of the present invention;

FIG. 2C is a schematic cross-sectional view illustrating the display panel according to the embodiment of the present invention along the dotted line AA of the FIG. 2A;

DETAILED DESCRIPTION

Figure 1:
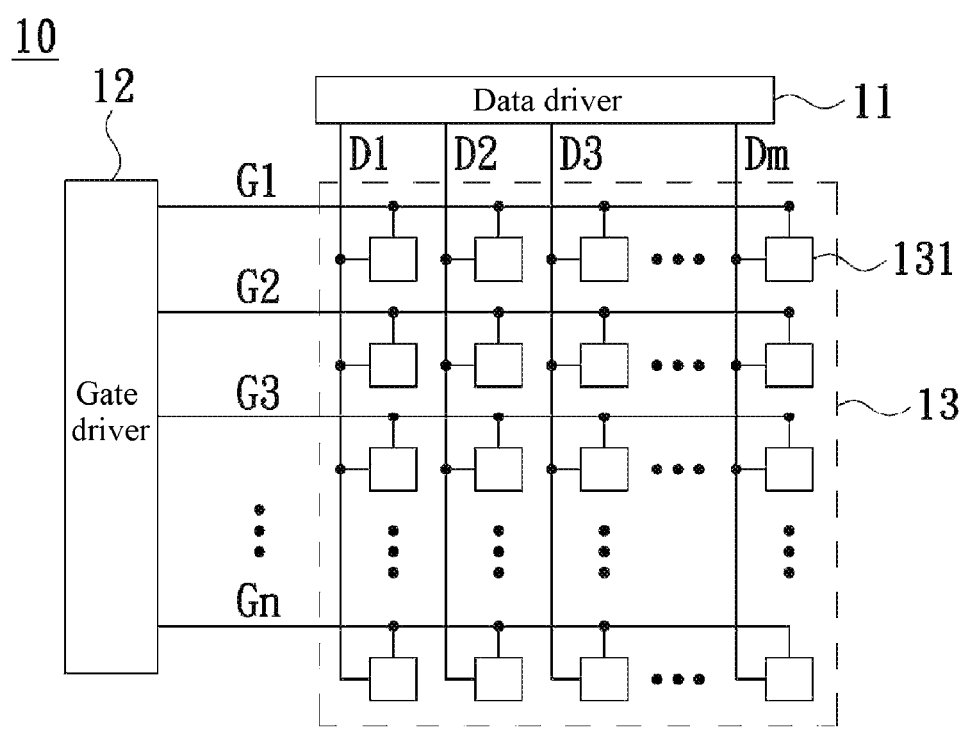
FIG. 1 is a schematic view illustrating a display device according to an embodiment of the present invention.

First, refer to FIG. 1. FIG. 1 is a schematic view illustrating a display device 10 according to an embodiment of the present invention. The display device 10 includes a data driver 11, a gate driver 12, and a display panel 13. A plurality of sub pixels 131 is configured on the display panel 13. The data driver 11 includes a plurality of data lines D1, D2, D3, . . . , and Dm. Each data line D1, D2, D3, . . . , Dm is separately electrically coupled to a particular sub pixel 131. Therefore, the data driver 11 transfer display data to the corresponding sub pixel 131 by using the data line D1, D2, D3, . . . , Dm. The gate driver 12 includes a plurality of gate lines G1, G2, G3, . . . , and Gn. Each gate line G1, G2, G3, . . . , Gn is separately electrically coupled to a particular sub pixel 131. Therefore, the gate driver 12 drive the corresponding sub pixel 131 by using the gate line G1, G2, G3, . . . , Gn, to enable the sub pixel 131 to receive the foregoing display data.

Figure 2A:
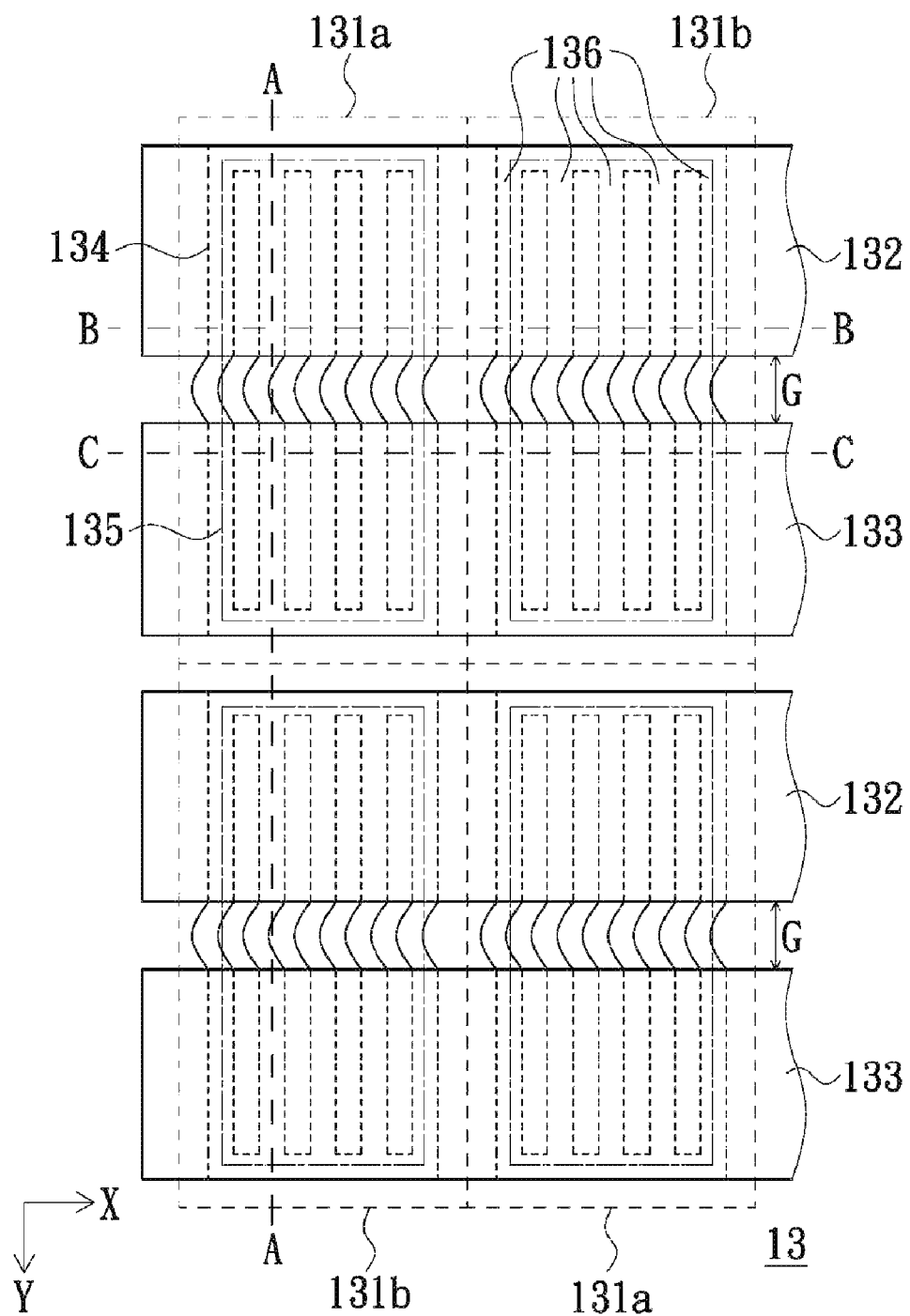
FIG. 2A is a schematic top view illustrating a display panel according to an embodiment of the present invention.

Next, refer to FIG. 2A. FIG. 2A is a schematic top view of a display panel 13 according to the Embodiment 1 of the present invention. The display panel 13 includes a plurality of first transparent electrodes 132, a plurality of second transparent electrodes 133, a plurality of first electrodes 134, and a plurality of second electrodes 135. In this embodiment, one of the first electrode 134 and the second electrode 135 is a pixel electrode, and another of the first electrode 134 and the second electrode 135 is a common electrode. A plurality of sub pixels 131a and a plurality of sub pixels 131b is also defined on the display panel 13. In this embodiment, two sub pixels 131a and two sub pixels 131b are used as an example, but the present invention is not limited thereto. Please refer to FIG. 2A, the sub pixels 131a and the sub pixels 131b are arranged in a staggered manner both in a first direction X and a second direction Y. The first direction X and the second direction Y are different from each other and are orthogonal to each other. But the present invention is not limited thereto, in another embodiment, the intersection angle of the first direction X and the second direction Y are greater or smaller than 90 degree. In FIG. 2A, the sub pixel 131a in the upper left corner is arranged in a staggered manner with the sub pixel 131b in the first direction X, so that the sub pixel 131b is located in the upper right corner, and the extended arrangement thereof in the first direction X is a sub pixel 131a, a sub pixel 131b, a sub pixel 131a, a sub pixel 131b, . . . , (not shown). Similarly, the sub pixel 131a in the upper left corner is arranged in a staggered manner with the sub pixel 131b in the second direction Y, so that the sub pixel 131b is located in the lower left corner of FIG. 2A, and the extended arrangement thereof in the second direction Y is a sub pixel 131a, a sub pixel 131b, a sub pixel 131a, a sub pixel 131b, . . . , (not shown). Therefore, in this embodiment, the sub pixels 131a and the sub pixels 131b are disposed staggered with each other, to form a matrix arrangement, and the sub pixel 131a is separately adjacent to a sub pixel 131b both in the first direction X and in the second direction Y. However, the present invention is not limited thereto. In anther embodiment, the sub pixels form an arrangement shape similar to a matrix or another arrangement shape according to a different requirement.

Continue to refer to FIG. 2A. The first transparent electrode 132 and the second transparent electrode 133 are configured on a same plane and separately extend in the first direction X. The first one from top to bottom in FIG. 2A is used as an example for the first transparent electrode 132. The first transparent electrode 132 extends from the sub pixel 131a to the sub pixel 131b in the first direction X. As can be seen from above, each row of pixels includes the plurality of sub pixels 131a and the plurality of sub pixels 131b. Therefore, the first transparent electrode 132 further continues to extend leftwards and rightwards to other sub pixels 131a and other sub pixels 131b, . . . , in the first direction X (not shown). The second one from top to bottom in FIG. 2A is used as an example for the second transparent electrode 133. The second transparent electrode 133 extends from the sub pixel 131a to the sub pixel 131b in the first direction X. Similarly, the second transparent electrode continues to extend leftwards and rightwards to other sub pixels 131a and other sub pixels 131b, . . . , in the first direction X (not shown). In addition, the first transparent electrode 132 and the second transparent electrode 133 are arranged in a staggered manner in the second direction Y, that is, in the second direction Y, the first transparent electrodes 132 and the second transparent electrodes 133 are arranged in a manner of a first transparent electrode 132, a second transparent electrode 133, a first transparent electrode 132, a second transparent electrode 133, a first transparent electrode 132, a second transparent electrode 133, . . . , (not shown). In other words, the first transparent electrode 132 is located between two second transparent electrodes 133. In this embodiment, the sub pixel 131a and the sub pixel 131b that are adjacent in the first direction X correspond to both the first transparent electrode 132 and the second transparent electrode 133. In the same sub pixel 131, a gap G exists between the first transparent electrode 132 and the second transparent electrode 133 which is disposed in turns in the second direction Y. In other words, a gap G exists between the first transparent electrode 132 and the second transparent electrode 133, so that the first transparent electrode 132 and the second transparent electrode 133 are separated from each other. The sub pixels 131a in FIG. 2A are used as an example. A vertical projection of the sub pixel 131a on one side of the gap G is overlapped with the first transparent electrode 132, and a vertical projection of the sub pixel 131a on another side of the gap G is overlapped with the second transparent electrode 133. Therefore, the position of the sub pixel 131a in the second direction Y sequentially corresponds to the first transparent electrode 132, the gap G, and the second transparent electrode 133. In summary, in this embodiment, the positions of the sub pixel 131a and the sub pixel 131b that are adjacent in the first direction X correspond to the same first transparent electrode 132 or the same second transparent electrode 133. While the positions of the sub pixel 131a and the sub pixel 131b that are adjacent in the second direction Y correspond to different first transparent electrodes 132 and different second transparent electrodes 133.

In this embodiment, each sub pixel 131 corresponds to the first electrode 134 and the second electrode 135. In other words, the first electrode 134 and the second electrode 135 are disposed on each sub pixel 131. In a same sub pixel 131, a vertical projection of the first electrode 134 on a substrate and a vertical projection of the second electrode 135 on the substrate are overlapped. Specifically, the first electrode 134 has a plurality of branches 136, as shown in FIG. 2B, and the plurality of branches 136 is connected to each other. Each branch 136 includes a first section 1361, a second section 1362, and a connecting section 1363. An end of the connecting section 1363 is connected to the first section 1361, and another end of the connecting section 1363 is connected to the second section 1362. In the embodiment in FIG. 2B, the plurality of branches 136 is connected to each other, so as to form a fence shape, and is fabricated into the first electrode 134 by using a same mask process. In another embodiment, the second electrode 135 has a plurality of branches 136 and form a fence shape like the foregoing the first electrode 134. In the embodiment, the connecting section 1363 has a bending angle, so that the connecting section 1363 has a "<<" shape or a "<" shape, and a vertical projection of the connecting section 1363 and a vertical projection of the foregoing gap G are overlapped in the same pixel 131. In another embodiment, a chamfer is formed at the bending angle of the connecting section 1363. When a voltage is applied to the branch 136 to cause a current to flow through the connecting section 1363, the bending angle of the connecting section 1363 enables the connecting section 1363 to form an electric field direction different from those of the first section 1361 and the second section 1362. This electric field direction is a rubbing direction of liquid crystal molecules. In this way, the liquid crystal molecules in the area corresponding to the connecting section 1363 are affected by the electric field formed by the connecting section 1363, thereby reducing a light leakage phenomenon.

Next, refer to FIG. 2C. FIG. 2C is a schematic cross-sectional view along the dotted line AA in FIG. 2A. In FIG. 2C, the display panel 13 includes a pair of substrates and a birefringent medium layer 139. The pair of substrates is a substrate 137 and a substrate 138, the birefringent medium layer 139 is sandwiched between the substrate 137 and the substrate 138. In the embodiment, the birefringent medium layer 139 is a liquid crystal molecule layer, but the present invention is not limited thereto. The first electrode 134 and the second electrode 135 are configured on an inner surface of the substrate 138. The first transparent electrode 132 and the second transparent electrode 133 are configured on an inner surface of the substrate 137. The second electrode 135 is disposed between the first electrode 134 and the substrate 138. An insulation layer is disposed between the first electrode 134 and the second electrode 135. In another embodiment, the first electrode 134 and the second electrode 135 is also configured on the inner surface of the substrate 137. The first transparent electrode 132 and the second transparent electrode 133 is also configured on the inner surface of the substrate 138. In this embodiment, vertical projections of the first electrode 134 and the second electrode 135 on the substrates are overlapped with each other in the same sub pixel. As shown in FIG. 2A and FIG. 2C, in the sub pixel 131a, a vertical projection of the first electrode 134 that is formed of the plurality of branches 136 and a vertical projection of a part of the second electrode 135 on the substrate 138 are overlapped. In addition, in a same sub pixel, the first transparent electrode 132 and the second transparent electrode 133 are also respectively overlapped with the first electrode 134 and the second electrode 135. Specifically, as shown in FIG. 2C, in the sub pixel 131a, a vertical projection of the first transparent electrode 132 on the substrate 138 is respectively overlapped with a vertical projection of the first electrode 134 or the second electrode 135 on the substrate 138, so that the first transparent electrode 132 covers a part of the first electrode 134 and a part of the second electrode 135. Similarly, a vertical projection of the second transparent electrode 133 on the substrate 138 is respectively overlapped with a vertical projection of the first electrode 134 or the second electrode 135 on the substrate 138, so that the second transparent electrode 133 covers a part of the first electrode 134 and a part of the second electrode 135. Therefore, in this embodiment, disposing the first electrode 134, the second electrode 135, the first transparent electrode 132, and the second transparent electrode 133 and transferring the different voltage signals to the first electrode 134, the second electrode 135, the first transparent electrode 132, and the second transparent electrode 133 are to control the birefringent medium layer 139, so that the display panel can be adjusted to a narrow viewing angle mode or a wide viewing angle mode.

In this embodiment, the first transparent electrodes 132 and the second transparent electrodes 133 are disposed in a staggered manner (arranged in a staggered manner), and the first transparent electrode 132 and the second transparent electrode 133 are separated from each other and are not in contact. That is, two transparent electrodes are electrically insulated from each other and are not electrically connected to each other. In particular, the first transparent electrode 132 and the second transparent electrode 133 are separated from each other, and the gap G exists between the first transparent electrode 132 and the second transparent electrode 133. Meanwhile, referring to FIG. 2C, in a same sub pixel (such as the sub pixel 131a), the gap G exists between the first transparent electrode 132 and the second transparent electrode 133, and the position of the gap G also corresponds to the first electrode 134 and the second electrode 135 in a vertical projection direction. Therefore, the first transparent electrode 132 and the second transparent electrode 133 in a same sub pixel are separated from each other, so that brightness compensation can be performed to achieve a display effect of even brightness.

Figure 2D:
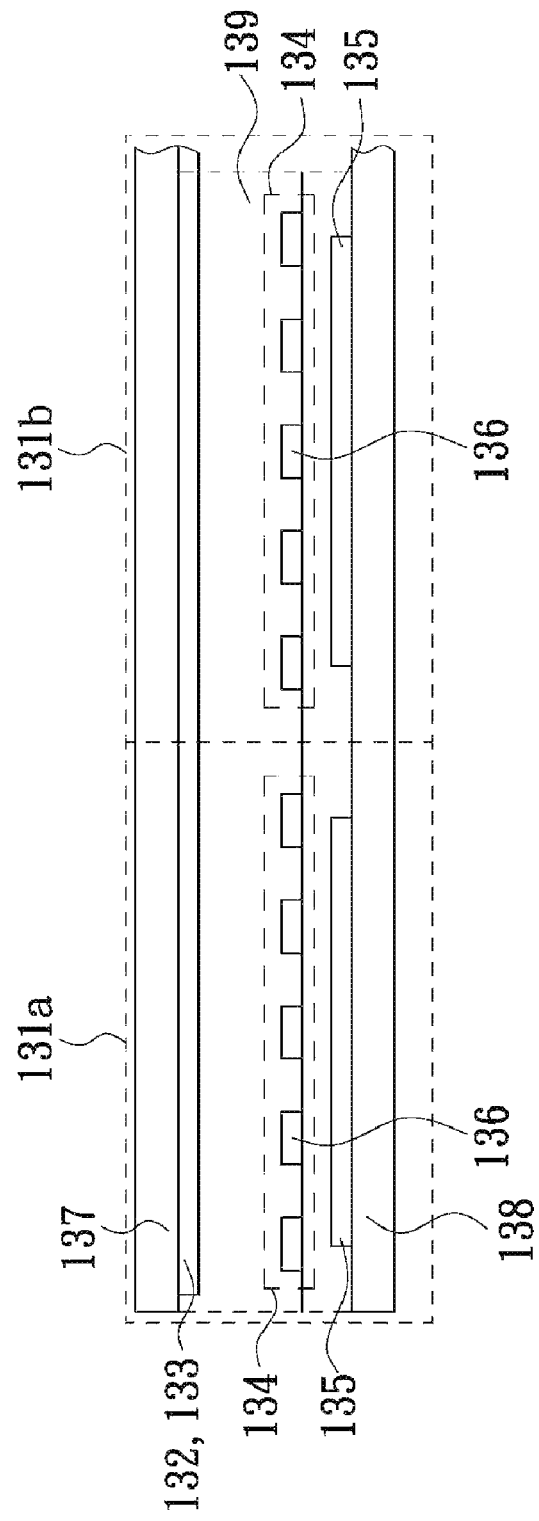
FIG. 2D is another schematic cross-sectional view of Embodiment 1 of the display panel according to the embodiment of the present invention along the dotted line BB and dotted line CC of the FIG. 2A.

Refer to FIG. 2D. FIG. 2D is a schematic cross-sectional view along the dotted line BB or dotted line CC in FIG. 2A. In this embodiment, along the dotted line BB, the first transparent electrode 132 is configured on the inner surface of the substrate 137, and along the dotted line CC, the second transparent electrode 133 is configured on the inner surface of the substrate 137. As shown in FIG. 2D, it is seen that the first electrode 134 includes the plurality of branches 136. Meanwhile, the positions of the first transparent electrode 132 and the second transparent electrode 133 respectively correspond to a plurality of sub pixels.

Figure 3:
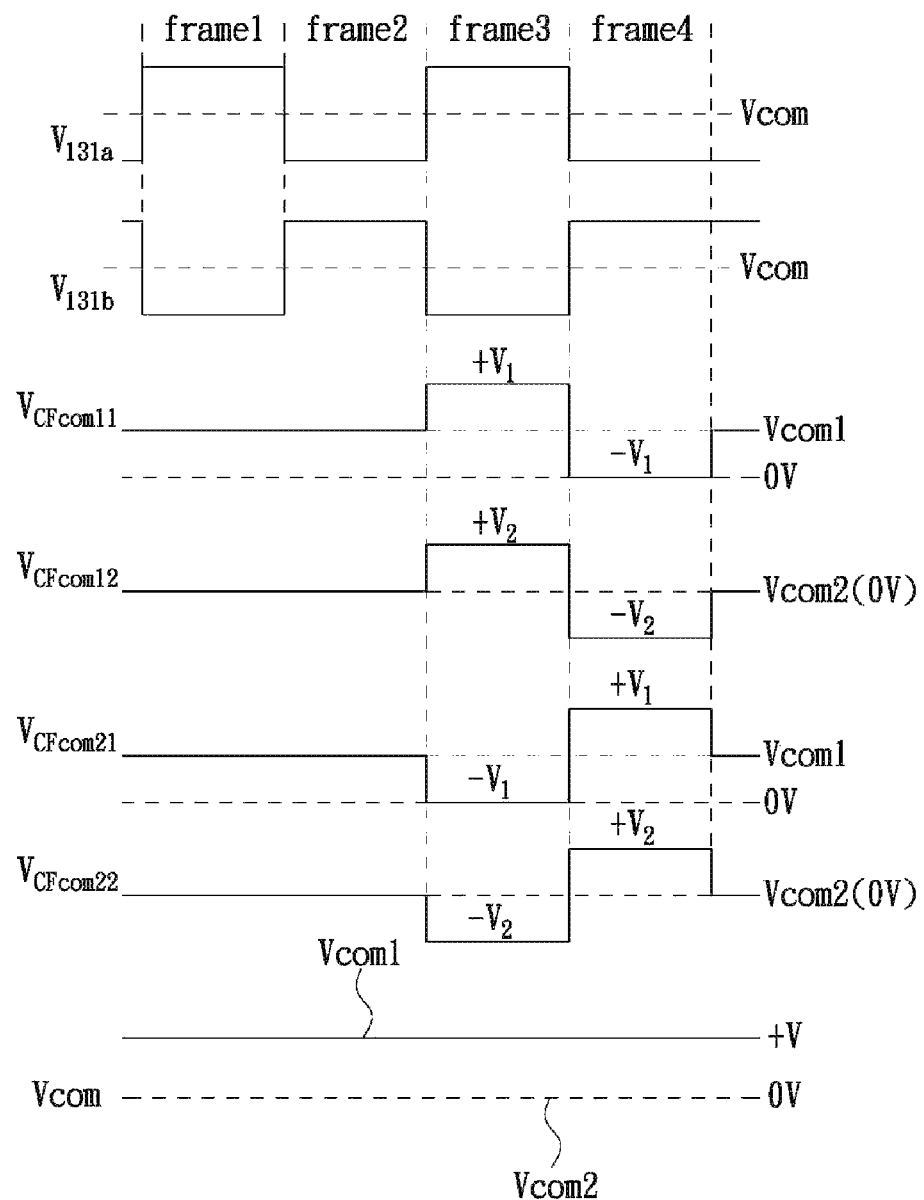
FIG. 3 is a schematic view of an embodiment of a voltage potential.

Next, refer to FIG. 3. FIG. 3 is a schematic view of an embodiment of voltages and potentials received by a first transparent electrode 132, a second transparent electrode 133, a first electrode 134, and a second electrode 135, wherein a horizontal-axis unit is time, and a vertical axis-unit is volt. FIG. 3 includes a data voltage $V_{131a}$ that is used to be provided to the sub pixel 131a, and a data voltage $V_{131b}$ that is used to be provided to the sub pixel 131b, a voltage $V_{CFcom11}$ and a voltage $V_{CFcom12}$ that are used to be provided to the first transparent electrode 132, a voltage $V_{CFcom21}$ and a voltage $V_{CFcom22}$ that are used to be provided to the second transparent electrode 133, and a common voltage $V_{com}$. The data voltage $V_{131a}$ and the data voltage $V_{131b}$ are used to be provided to a corresponding pixel electrode, so that the sub pixel 131a and the sub pixel 131b display brightness according to the received data voltage $V_{131a}$ and data voltage $V_{131b}$. When the data voltage $V_{131a}$ and the data voltage $V_{131b}$ are respectively higher than the common voltage $V_{com}$, it is called that a corresponding sub pixel 131 has a positive polarity, and in contrast, when the data voltage $V_{131a}$ and the data voltage $V_{131b}$ are respectively lower than the common voltage $V_{com}$, it is called that a corresponding sub pixel 131 has a negative polarity. The voltage $V_{CFcom11}$ and the voltage $V_{CFcom12}$ that are provided to the first transparent electrode 132 and the voltage $V_{CFcom21}$ and the voltage $V_{CFcom22}$ that are provided to the second transparent electrode 133 are used to assist adjustment of a refraction angle of a birefringent medium layer 139. The common voltage $V_{com}$ is used to be provided to a common electrode, so that the birefringent medium layer 139 changes the refraction angle of the birefringent medium layer 139 according to a voltage difference between the pixel electrode and the common electrode. In this embodiment, the common voltage $V_{com}$ further includes the common voltage $V_{com1}$ and the common voltage $V_{com2}$, where a potential of the common voltage $V_{com1}$ is a voltage value greater than a potential of the common voltage $V_{com2}$, and a voltage value of the common voltage $V_{com2}$ is 0 volt, but the present invention is not limited thereto. When the common voltage $V_{com}$ is $V_{com1}$, the first transparent electrode 132 selectively receives the voltage $V_{CFcom11}$, and the second transparent electrode 133 selectively receives the voltage $V_{CFcom21}$. Similarly, when the common voltage $V_{com}$ is $V_{com2}$, the first transparent electrode 132 selectively receives the voltage $V_{CFcom12}$, and the second transparent electrode 133 selectively receives the voltage $V_{CFcom22}$.

The embodiment of the present invention is further described below with reference to FIG. 2A, FIG. 2B, FIG. 2C, FIG. 2D, and FIG. 3. First, the sub pixels 131a in FIG. 2A are used as an example, where the first electrode 134 of the sub pixel 131a is a pixel electrode, and is configured to receive the foregoing data voltage $V_{131a}$, and the second electrode 135 of the sub pixel 131a is a common electrode, and is configured to receive the foregoing common voltage $V_{com1}$. First, within a time period of displaying a frame 1 and a frame 2, the display panel 13 is in a wide viewing angle mode. Therefore, the voltage $V_{CFcom11}$ and the voltage $V_{CFcom21}$ are the same as the common voltage $V_{com1}$, and the voltage $V_{CFcom12}$ and the voltage $V_{CFcom22}$ are the same as the common voltage $V_{com2}$. When the frame 1 is being displayed, the sub pixel 131a has a positive polarity because the data voltage $V_{131a}$ is higher than the common voltage $V_{com}$, and the sub pixel 131b has a negative polarity because the data voltage $V_{131b}$ is lower than the common voltage $V_{com}$. When the frame 2 is being displayed, the sub pixel 131a has a negative polarity because the data voltage $V_{131a}$ is lower than the common voltage $V_{com}$, and the sub pixel 131b has a positive polarity because the data voltage $V_{131b}$ is higher than the common voltage $V_{com}$. That is, in a same frame (for example, the frame 1 and the frame 2), the sub pixel 131a and the sub pixel 131b have different polarities. Therefore, when the display panel 13 is in the wide viewing angle mode, it is made that voltages of the first transparent electrode 132 and the second transparent electrode 133 are the same as the common voltage $V_{com}$, so as to prevent electric fields that are formed between the first transparent electrode 132 and the common voltage $V_{com}$ and between the second transparent electrode 133 and the common voltage $V_{com}$ from affecting a change of a viewing angle of the birefringent medium layer 139. It makes sure that displaying in the wide viewing angle mode can be performed.

Within a time period of displaying a frame 3 and a frame 4, the display panel 13 is in a narrow viewing angle mode. Therefore, a voltage difference $V_1$ exists between the voltage $V_{CFcom11}$ and the common voltage $V_{com1}$ and between the voltage $V_{CFcom21}$ and the common voltage $V_{com1}$, and a voltage difference $V_2$ exists between the voltage $V_{CFcom12}$ and the common voltage $V_{com2}$ and between the voltage $V_{CFcom22}$ and the common voltage $V_{com2}$. Further specifically, when the frame 3 is being displayed, the voltage $V_{CFcom11}$ is higher than the common voltage $V_{com1}$, and a voltage difference between the voltage $V_{CFcom11}$ and the common voltage $V_{com1}$ is the voltage $V_1$, while the voltage $V_{CFcom21}$ is lower than the common voltage $V_{com1}$, and a voltage difference between the voltage $V_{CFcom21}$ and the common voltage $V_{com1}$ also is the voltage $V_1$. When the frame 4 is being displayed, the voltage $V_{CFcom11}$ is lower than the common voltage $V_{com1}$, and a voltage difference between the voltage $V_{CFcom11}$ and the common voltage $V_{com1}$ is the voltage $V_1$, while the voltage $V_{CFcom21}$ is higher than the common voltage $V_{com1}$, and a voltage difference between the voltage $V_{CFcom21}$ and the common voltage $V_{com1}$ also is the voltage $V_1$. Similarly, referring to the voltage $V_{CFcom12}$ in FIG. 3, when the frame 3 is being displayed, the voltage $V_{CFcom12}$ is higher than the common voltage $V_{com2}$, and a voltage difference between the voltage $V_{CFcom12}$ and the common voltage $V_{com2}$ is the voltage $V_2$, while the voltage $V_{CFcom22}$ is lower than the common voltage $V_{com2}$, and a voltage difference between the voltage $V_{CFcom22}$ and the common voltage $V_{com2}$ also is the voltage $V_2$. When the frame 4 is being displayed, the voltage $V_{CFcom12}$ is lower than the common voltage $V_{com2}$, and a voltage difference between the voltage $V_{CFcom12}$ and the common voltage $V_{com2}$ is voltage $V_2$, while the voltage $V_{CFcom22}$ is higher than the common voltage $V_{com2}$, and a voltage difference between the voltage $V_{CFcom22}$ and the common voltage $V_{com2}$ also is voltage $V_2$. Continue to refer to the data voltage $V_{131a}$ in FIG. 3. When the frame 3 is being displayed, the sub pixel 131a has a positive polarity because the data voltage $V_{131a}$ is higher than the common voltage $V_{com}$, and the sub pixel 131b has a negative polarity because the data voltage $V_{131b}$ is lower than the common voltage $V_{com}$. When the frame 4 is being displayed, the sub pixel 131a has a negative polarity because the data voltage $V_{131a}$ is lower than the common voltage $V_{com}$, and the sub pixel 131b has a positive polarity because the data voltage $V_{131b}$ is higher than the common voltage $V_{com}$. Therefore, when the display panel 13 is in the narrow viewing angle mode, the electric fields formed between the first transparent electrode 132 and the common voltage $V_{com}$ and between the second transparent electrode 132 and the common voltage $V_{com}$ cause the refraction angle of the birefringent medium layer 139 to change, and the change of the refraction angle does not affect a viewing angle requirement of the narrow viewing angle mode. Meanwhile, the voltages of the first transparent electrode 132 and the second transparent electrode 133 is used to adjust the refraction angle of the birefringent medium layer 139 to make display brightness even. Specifically, displaying of the frame 3 is used as an example. The voltage $V_{CFcom11}$ of the first transparent electrode 132 is higher than the common voltage $V_{com1}$, the voltage $V_{CFcom21}$ of the second transparent electrode 133 is lower than the common voltage $V_{com1}$, and a voltage difference value between the data voltage $V_{131a}$ and the voltage $V_{CFcom11}$ is less than a difference value between the data voltage $V_{131a}$ and the voltage $V_{CFcom21}$. Therefore, under the influence of the voltage $V_{CFcom21}$, the display brightness formed of a part of the birefringent medium layer 139 is lower than the display brightness formed of the part of the birefringent medium layer 139 under the influence of the voltage $V_{CFcom11}$. In other words, in a single frame, a single sub pixel 131a having the first transparent electrode 132 and the second transparent electrode 133 displays different brightness at the same time. Similarly, when the frame 4 is being displayed, the voltage $V_{CFcom11}$ of the first transparent electrode 132 is lower than the common voltage $V_{com1}$, the voltage $V_{CFcom21}$ of the second transparent electrode 133 is higher than the common voltage $V_{com1}$, and a voltage difference value between the data voltage $V_{131a}$ and the voltage $V_{CFcom11}$ is less than a difference value between the data voltage $V_{131a}$ and the voltage $V_{CFcom21}$. Therefore, under the influence of the voltage $V_{CFcom21}$, the display brightness formed of a part of the birefringent medium layer 139 is lower than the display brightness formed of the part of the birefringent medium layer 139 under the influence of the voltage $V_{CFcom11}$. In this embodiment, in the same frame (in a frame), a single sub pixel 131a displays different brightness according to the first transparent electrode 132 and the second transparent electrode 133, and different brightness reaches a balance to generate average brightness. In view of the foregoing description, for a plurality of frames, a sub pixel 131 in each frame can display similar average brightness, because the first transparent electrode 132 and the second transparent electrode 133 are disposed. It results that a displayed picture can form even brightness.

Figure 4:
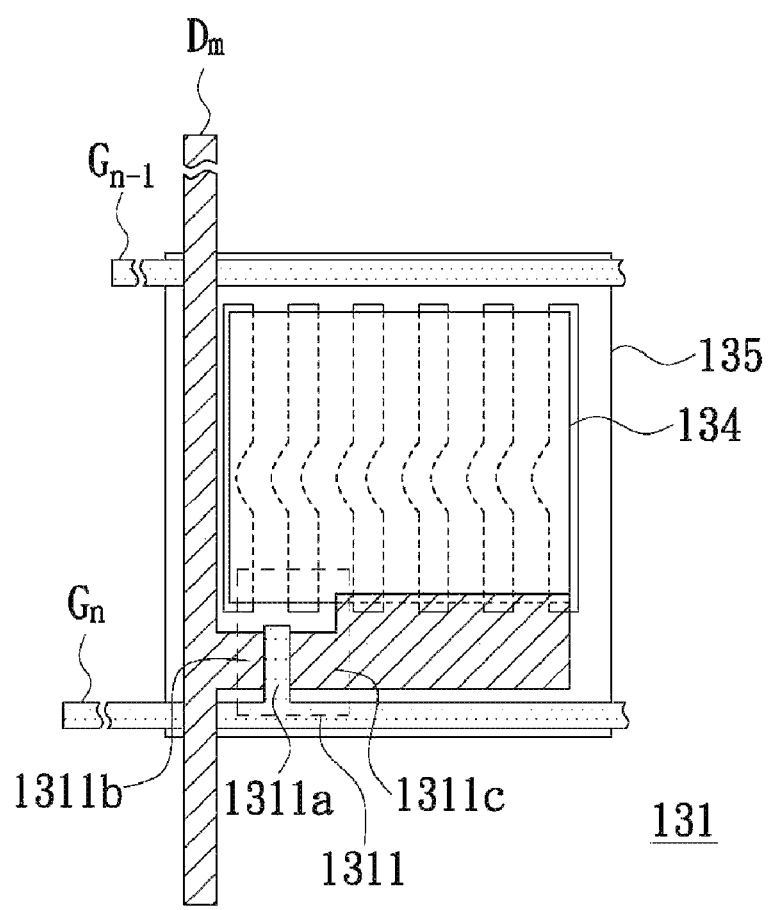
FIG. 4 is a schematic top view illustrating a sub pixel according to the embodiment of the present invention.

Next, refer to FIG. 4. FIG. 4 is a schematic top view of an embodiment of a sub pixel 131, wherein a first transparent electrode 132, a second transparent electrode 132, and a substrate 137 are omitted, so that it is easy to make the drawing. The sub pixel 131 includes a transistor 1311, and the transistor 1311 includes a gate 1311a, a source 1311b, and a drain 1311c. The gate 1311a is electrically coupled to a gate line, such as a gate line $G_n$, and the source 1311b is electrically coupled to a data line, such as a data line $D_m$. The drain 1311c is electrically coupled to the first electrode 134. The sub pixel 131 also includes the second electrode 135. In this embodiment, the second electrode 135 is configured below the first electrode 134, that is, the second electrode 135 is located between the first electrode 134 and the substrate. Meanwhile, a vertical projection of the first electrode 134 on the substrate is overlapped with a vertical projection of the second electrode 135 on the substrate. The second electrode 135 has a plurality of branches to have a fence shape as shown in FIG. 2B. However, the present invention is not limited thereto. For example, the drain is also electrically coupled to the second electrode 135, and the first electrode 134 is formed of a plurality of branches.

Figure 5A:
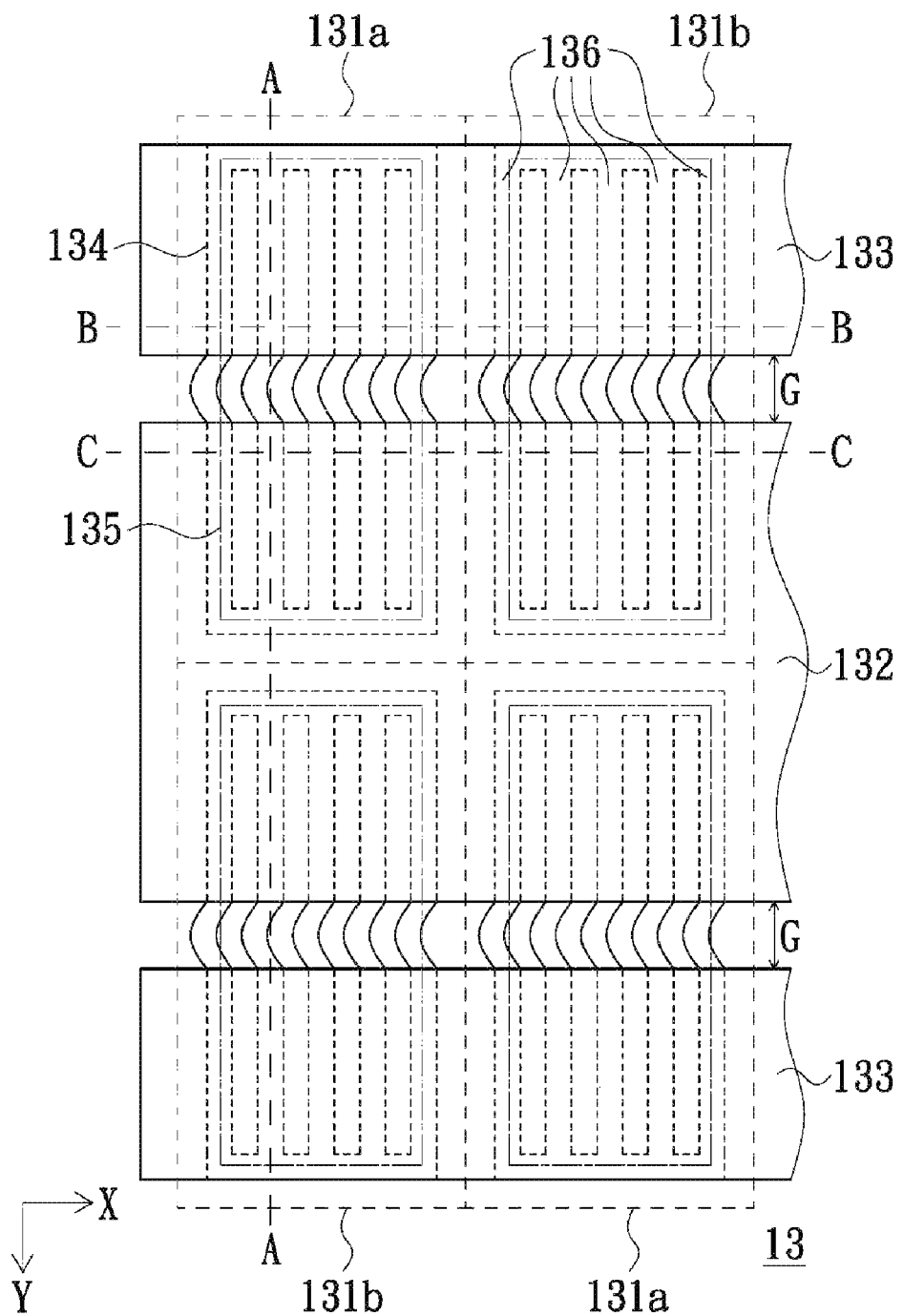
FIG. 5A is a schematic top view illustrating a display panel according to another embodiment of the present invention.

Next, refer to FIG. 5A. FIG. 5A is a schematic top view of a display panel 13 according to the Embodiment 2 of the present invention. The same reference numerals in FIG. 5A and FIG. 2A represent the same elements. A difference between FIG. 5A and FIG. 2A lies in that, in this embodiment, a first transparent electrode 132 and a second transparent electrode 133 simultaneously correspond to a plurality of sub pixels 131 in different rows. For example, in FIG. 5A, the first transparent electrode 132 simultaneously correspond to the parts of the sub pixel 131a and the sub pixel 131b in the row above (in the first row), and simultaneously correspond to the parts of the sub pixel 131a and the sub pixel 131b in the row below (in the second row). The parts of the sub pixel 131a and the sub pixel 131b in the row above (in the first row) correspond to the second transparent electrode 133, and the parts of the sub pixel 131a and the sub pixel 131b in the row below (in the second row) correspond to the second transparent electrode 133. The first transparent electrode 132 in FIG. 5A is used as an example. In FIG. 5A, a vertical projection formed of a partial area of the sub pixel 131a in the upper left corner on a second substrate is overlapped with a vertical projection formed of a part of the first transparent electrode 132 on the second substrate. Meanwhile, in FIG. 5A, a vertical projection formed of a partial area of the sub pixel 131b in the upper right corner on the second substrate is overlapped with a vertical projection formed of a part of the first transparent electrode 132 on the second substrate, so that partial areas of the sub pixel 131a and the sub pixel 131b in the row above (in the first row) correspond to the first transparent electrode 132. In FIG. 5A, a vertical projection formed of a partial area of the sub pixel 131b in the lower left corner on the second substrate is overlapped with a vertical projection formed of a part of the first transparent electrode 132 on the second substrate. Meanwhile, a vertical projection formed of a partial area of the sub pixel 131a in the lower right corner in FIG. 5A on the second substrate is overlapped with a vertical projection formed of a part of the first transparent electrode 132 on the second substrate, so that the partial areas of the sub pixel 131a and the sub pixel 131b in the row below (in the second row) correspond to the first transparent electrode 132. Therefore, in this embodiment, it is be understood that the first transparent electrode 132 respectively correspond to different sub pixels. Similarly, a vertical projection formed of a partial area of the sub pixel 131a on the upper left corner in the FIG. 5A on the second substrate is overlapped with a vertical projection of a part of the second transparent electrode 133. Vertical projections formed of a partial area of the sub pixel 131b in the upper right corner in FIG. 5A, a partial area of the sub pixel 131b in the lower left corner in FIG. 5A, and a partial area of the sub pixel 131a in the lower right corner in FIG. 5A on the second substrate is respectively overlapped with a vertical projection formed of a part of the second transparent electrode 133 on the second substrate. Therefore, in this embodiment, it is understood that the second transparent electrode 133 respectively correspond to different sub pixels. In other words, for a single sub pixel 131 in this embodiment, each sub pixel 131 still simultaneously corresponds to the first transparent electrode 132 and the second transparent electrode 133, which is the same as FIG. 2A. In summary, in this embodiment, the positions of the sub pixel 131a and the sub pixel 131b that are adjacent in a first direction X correspond to a same first transparent electrode 132 and a same second transparent electrode 133, and the positions of the sub pixel 131a and the sub pixel 131b that are adjacent in a second direction Y correspond to one of same first transparent electrodes 132 or second transparent electrodes 133, and correspond to another one of different first transparent electrodes 132 or second transparent electrodes 133.

Figure 5B:
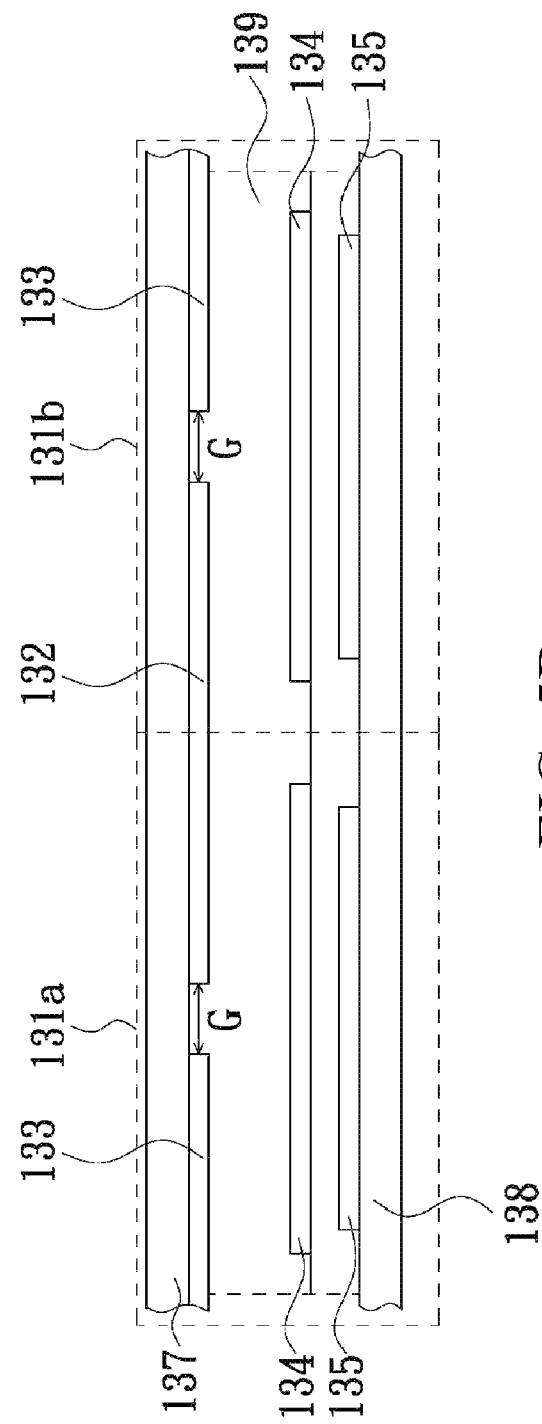
FIG. 5B is a schematic cross-sectional view of Embodiment 2 of the display panel according to the embodiment of the present invention along the dotted line AA in FIG. 5A.

Referring to FIG. 5B. FIG. 5B is a schematic cross-sectional view along the dotted line AA in FIG. 5A. The same reference numerals in FIG. 5B and FIG. 2C represent the same elements, and are therefore no longer elaborated. A difference between FIG. 5B and FIG. 2C lies in that the first transparent electrode 132 and the second transparent electrode 133 traverse two sub pixels 131, while in FIG. 5B, the first transparent electrode 132 is used as an example for description. In this embodiment, a gap G exists between the first transparent electrode 132 and the second transparent electrode 133, that is, the first transparent electrode 132 and the second transparent electrode 133 are electrically isolated from each other and are not connected to each other. As shown in FIG. 5B, a same first transparent electrode 132 corresponds to a part of the sub pixel 131a and a part of the sub pixel 131b. In other words, as seen from the sub pixel 131a and the sub pixel 131b that are adjacently arranged in the second direction Y, a sequence in which transparent electrodes of the sub pixel 131a and the sub pixel 131b is the second transparent electrode 133 of the sub pixel 131a, the first transparent electrode 132 of the sub pixel 131a, the first transparent electrode 132 of the sub pixel 131b, the second transparent electrode 133 of the sub pixel 131b. The first transparent electrodes 132 that are respectively located at the sub pixel 131a and the sub pixel 131b are structurally connected and is made in a same mask process, and are therefore regarded as a complete, single (one piece), same electrode structure.

Figure 6A:
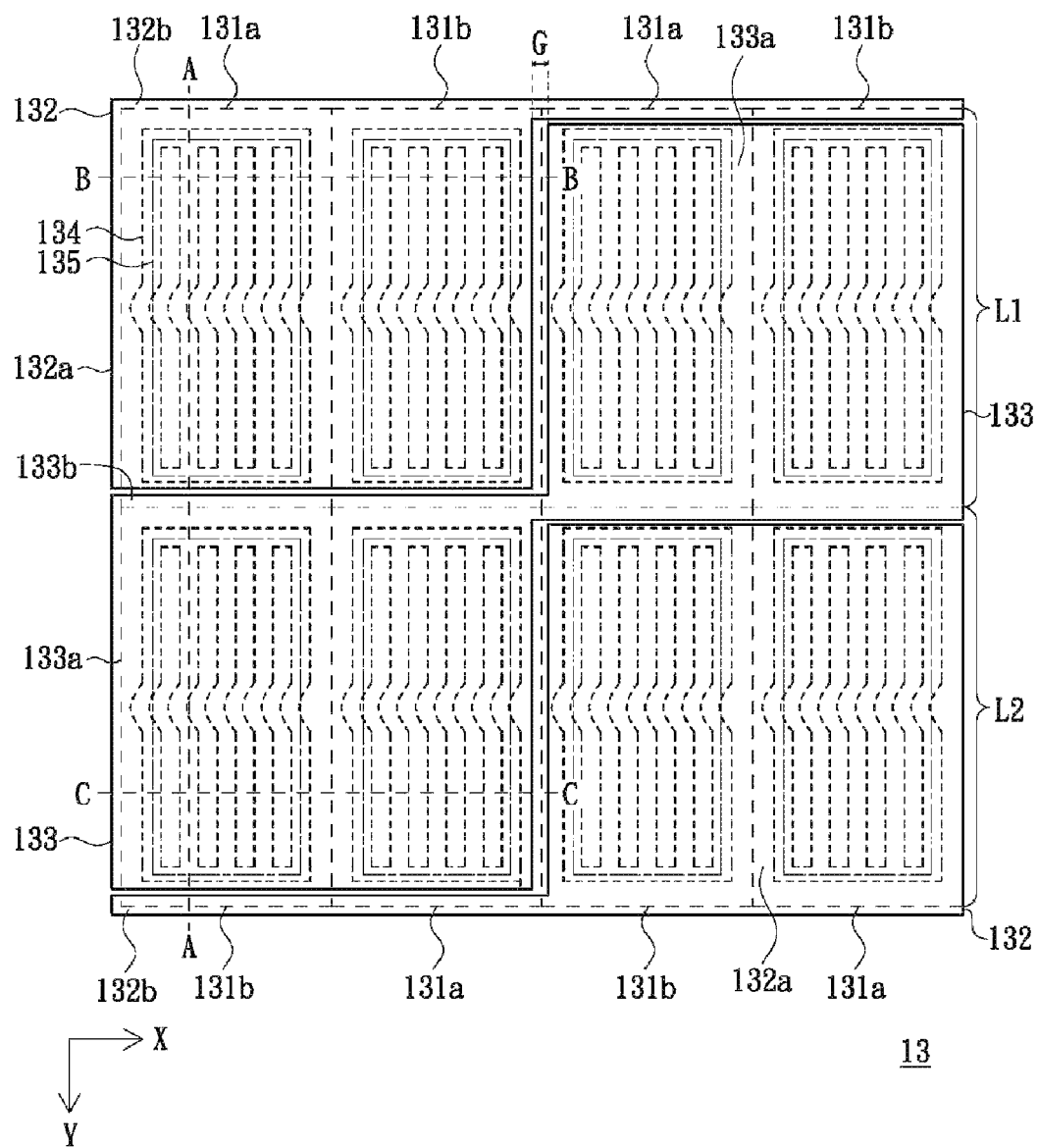
FIG. 6A is a schematic top view illustrating a display panel according to another embodiment of the present invention.
Figure 6B:
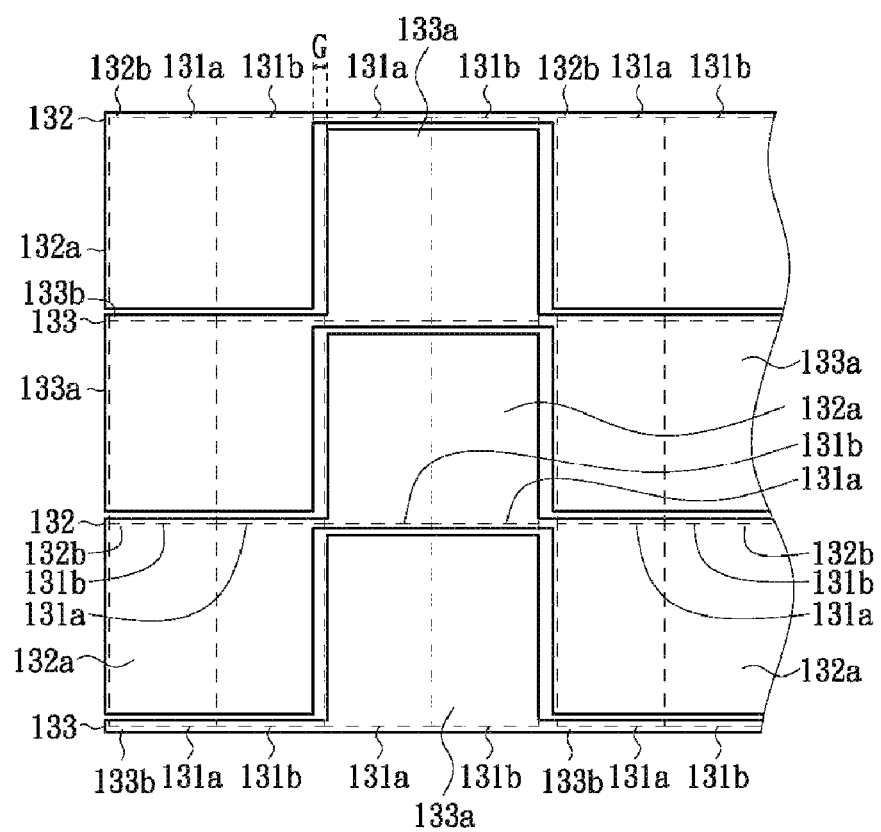
FIG. 6B is a schematic view illustrating the transparent electrodes according to the embodiment of the present invention.

Next, refer to FIG. 6A. FIG. 6A is a schematic top view of a display panel 13 according to the Embodiment 3 of the present invention. The same reference numerals in FIG. 6A and FIG. 2A represent the same elements, and are no longer elaborated below. In the embodiment in FIG. 6A, eight sub pixels 131 are used as an example to perform description, but the present invention is not limited thereto. At the upper half part in FIG. 6A, a sub pixel 131a, a sub pixel 131b, a sub pixel 131a, and a sub pixel 131b that are arranged in a first direction X and are sequenced from left to right are a first row L1 of sub pixels, and at the lower half part in FIG. 6A, a sub pixel 131b, a sub pixel 131a, a sub pixel 131b, and a sub pixel 131a that are arranged in the first direction X and are sequenced from left to right are a second row L2 of sub pixels. A difference between FIG. 6A and FIG. 2A lies in that positions of the sub pixel 131a and the sub pixel 131b on a left half side of the first row L1 correspond to a first transparent electrode 132, positions of the sub pixel 131a and the sub pixel 131b on a right half side of the first row L1 correspond to a second transparent electrode 133, positions of the sub pixel 131b and the sub pixel 131a on a left half side of the second row L2 correspond to a second transparent electrode 133, and positions of the sub pixel 131b and the sub pixel 131a on a right half side of the second row L2 correspond to a first transparent electrode 132. In this embodiment, the first transparent electrode 132 and the second transparent electrode 133 are a pectinate-shaped electrode. The first transparent electrode 132 includes first electrode parts 132a and a first wiring part 132b that are connected to each other, and the second transparent electrode 133 includes second electrode parts 133a and a second wiring part 133b that are connected to each other, as shown in FIG. 6B. Referring to both FIG. 6A and FIG. 6B, the first wiring part 132b and the second wiring part 133b are configured between two sub pixels 131 that are arranged in a second direction Y, that is, between two adjacent rows of sub pixels 131. Specifically, FIG. 6A is used as an example. The second wiring part 133b is configured between the first row L1 of sub pixels and the second row L2 of sub pixels, and the first wiring part 132b is configured between the first row L1 of sub pixels and a sub pixel (not shown) adjacent to the first row L1 of sub pixels, so that the first wiring parts 132b and the second wiring parts 133b are arranged in the second direction Y in a staggered manner. In this embodiment, the first electrode parts 132a and the second electrode parts 133a are arranged in a staggered manner in the first direction X and the second direction Y. Specifically, FIG. 6A or FIG. 6B is used as an example. A second electrode part 133a is on the right side of a first electrode part 132a in the first row L1, a second electrode part 133a in the second row L2 is below the first electrode part 132a in the first row L1, and a gap G exists between the first electrode part 132a and the second electrode part 133a in the first direction X. Therefore, positions at which the sub pixel 131a and the sub pixel 131b are disposed on the left half side of the first row L1 correspond to the first electrode part 132a of the first transparent electrode 132, and positions at which the sub pixel 131a and the sub pixel 131b are disposed on the right half side of the first row L1 correspond to the second electrode part 133a of the second transparent electrode 133. The sub pixel 131b and the sub pixel 131a on the left half side of the second row L2 are disposed corresponding to the second electrode part 133a of the second transparent electrode 133, and the sub pixel 131b and the sub pixel 131a on the right half side of the second row are disposed corresponding to the first electrode part 132a of the first transparent electrode 132.

Figure 6C:
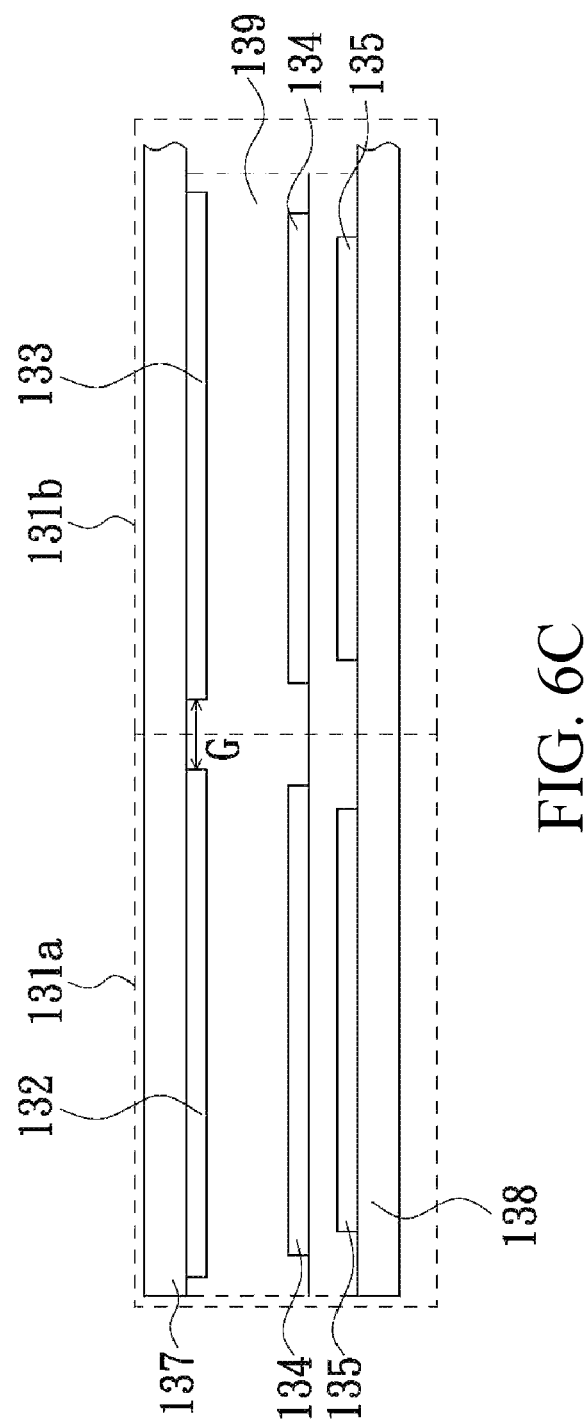
FIG. 6C is a schematic cross-sectional view illustrating the display panel according to the embodiment of the present invention along the dotted line AA in FIG. 6A.

FIG. 6C is a schematic cross-sectional view along the dotted line AA in FIG. 6A. The same reference numerals in FIG. 6C and FIG. 2C represent the same elements, and are no longer elaborated below. A difference between FIG. 6C and FIG. 2C lies in that in FIG. 6A, two sub pixels 131 that are arranged in the second direction Y (that is, an extending direction of the dotted line AA) correspond to different transparent electrodes, that is, the first transparent electrode 132 or the second transparent electrode 133. Therefore, in FIG. 6C, the sub pixel 131a corresponds to the first transparent electrode 132, and the sub pixel 131b corresponds to the second transparent electrode 133. Schematic cross-sectional views along a dotted line BB and a dotted line CC in FIG. 6A are the same as FIG. 2D, and are therefore no longer elaborated. In summary, in the embodiment shown in FIG. 6A, the sub pixel 131a and the sub pixel 131b that are adjacent in the first direction X correspond to a same transparent electrode, and the single sub pixel 131a and the single sub pixel 131b that correspond to the same transparent electrode is regarded as a sub pixel group, and a plurality of sub pixel groups that is adjacently arranged in the first direction X corresponds to different transparent electrodes. FIG. 6A is used as an example. The first row L1 from left to right is respectively a first transparent electrode 132, a second transparent electrode 133, a first transparent electrode 132, a second transparent electrode 133, . . . , (not shown). In another aspect, the sub pixel 131a and the sub pixel 131b that are adjacent in the second direction Y corresponds to different transparent electrodes. Similarly, if the sub pixel 131a and the sub pixel 131b form a sub pixel group, a plurality of sub pixel groups that is adjacently arranged in the second direction Y also corresponds to different transparent electrodes. FIG. 6A is used as an example. At the left half part of FIG. 6A, the transparent electrodes that are adjacently arranged in the second direction Y are sequentially a first transparent electrode 132, a second transparent electrode 133, a first transparent electrode 132, a second transparent electrode 133, . . . , (not shown).

Description is provided below with reference to FIG. 6A, FIG. 6C, and FIG. 3. In FIG. 6A, the first electrode 134 of the sub pixel 131a and the first electrode 134 of the sub pixel 131b are separately configured to receive a data voltage $V_{131a}$ and a data voltage $V_{131b}$, and the second electrode 135 that is used as a common electrode is configured to receive a common voltage $V_{com}$. The first transparent electrode 132 determines to receive a voltage $V_{CFcom11}$ or a voltage $V_{CFcom12}$ according to a selected common voltage $V_{com}$, and the second transparent electrode 132 determines to receive a voltage $V_{CFcom21}$ or a voltage $V_{CFcom22}$ according to a selected common voltage $V_{com}$. Description is provided below by using the voltage $V_{CFcom11}$, the voltage $V_{CFcom21}$, and the common voltage $V_{com1}$ as an example.

Within a time period of displaying the frame 1 and the frame 2 in FIG. 3, the display panel 13 is in a wide viewing angle mode, and this case is no longer elaborated below. Within a time period of displaying the frame 3 and the picture 4 in FIG. 3, the display panel 13 is in a narrow viewing angle mode, and a voltage difference $V_1$ exists between the voltage $V_{CFcom11}$ and the common voltage $V_{com1}$ and between the voltage $V_{CFcom21}$ and the common voltage $V_{com1}$. Therefore, when the display panel 13 in FIG. 6A is in the narrow viewing angle mode, the electric fields formed between the first transparent electrode 132 and the common voltage $V_{com}$ and between the second transparent electrode 132 and the common voltage $V_{com}$ cause the refraction angle of the birefringent medium layer 139 to change. Specifically, displaying of the frame 3 is used as an example, the birefringent medium layer 139 is under the influence of the voltage $V_{CFcom11}$ to result that the brightness corresponds to the sub pixel 131b is lower than the brightness corresponds to the sub pixel 131a. That is, the adjacent of the sub pixel 131a and the sub pixel 131b that correspond to a same first electrode 132 simultaneously display different brightness. The birefringent medium layer 139 is under the influence of the voltage $V_{CFcom21}$ to result that the brightness corresponds to the sub pixel 131a is lower than the brightness corresponds to the sub pixel 131b. That is, the adjacent of the sub pixel 131a and the sub pixel 131b that correspond to a same second electrode 133 simultaneously display different brightness.

Within a time period of displaying the frame 4, the birefringent medium layer 139 is under the influence of the voltage $V_{CFcom11}$ to result that the brightness corresponds to the sub pixel 131b is lower than the display brightness corresponds to the sub pixel 131a. That is, the adjacent of the sub pixel 131a and the sub pixel 131b that correspond to a same first electrode 132 simultaneously display different brightness. The birefringent medium layer 139 that is under the influence of the voltage $V_{CFcom21}$ to result that the brightness corresponds to the sub pixel 131a is lower than the display brightness corresponds to the sub pixel 131b. That is, the adjacent of the sub pixel 131a and the sub pixel 131b that correspond to a same second electrode 133 simultaneously display different brightness. In addition, in a same frame, the brightness of a sub pixel 131a corresponding to a first transparent electrode 132 is higher than the brightness of a sub pixel 131b corresponding to the same first transparent electrode 132, and the brightness of a sub pixel 131a corresponding to a second transparent electrode 133 is lower than the brightness of a sub pixel 131b corresponding to the same second transparent electrode 133. Therefore, in this embodiment, in a single frame, the sub pixel 131a and the sub pixel 131b that correspond to a same electrode simultaneously display different brightness due to the first transparent electrode 132 and the second transparent electrode 133. In a single frame, the sub pixels 131a that correspond to different transparent electrodes display different brightness, and the sub pixels 131b that correspond to different transparent electrodes display different brightness. However, in a case in which one first transparent electrode 132 and one second transparent electrode 133 form one transparent electrode group, in a single frame, each transparent electrode group displays the same average brightness because the first transparent electrode 132 and the second transparent electrode 133 balance brightness with each other, so that the brightness of a displayed picture is generally average.

Figure 7A:
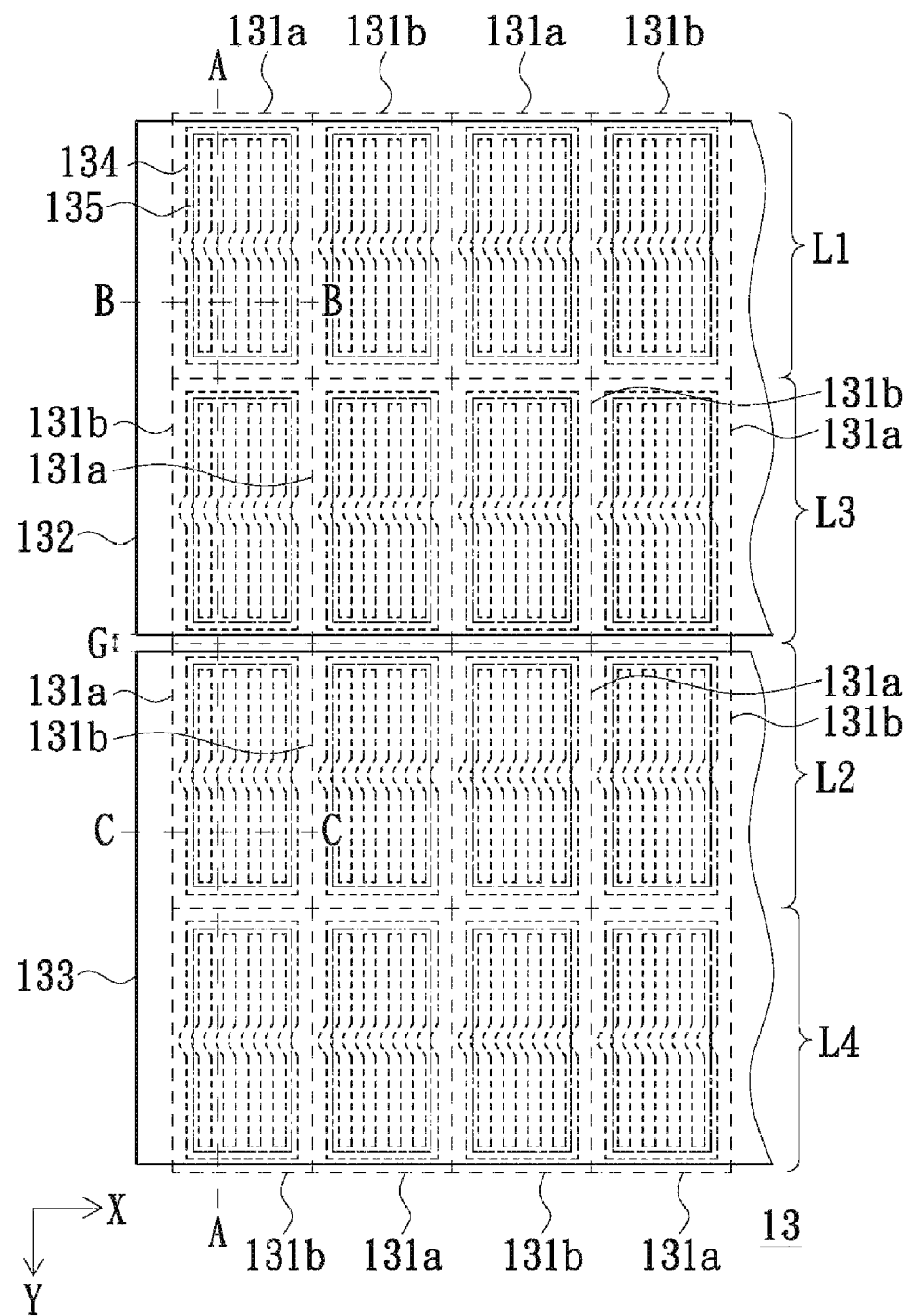
FIG. 7A is a schematic top view illustrating a display panel according to another embodiment of the present invention.

Next, refer to FIG. 7A. FIG. 7A is a schematic top view of a display panel 13 according to the Embodiment 4 of the present invention. The same reference numerals in FIG. 7A and FIG. 6A represent the same elements, and are no longer elaborated below. A difference between FIG. 7A and FIG. 6A lies in that the display panel 13 further includes a third row L3 and a fourth row L4 between a first row L1 and a second row L2. That is, the third row L3 and the fourth row L4 are configured on two opposite sides of the second row L2, so that the second row L2 is located between the third row L3 and the fourth row L4. In this embodiment, for example, each row has four sub pixels 131, and the sub pixels 131a and the sub pixels 131b are respectively configured in a staggered manner in a first direction X and a second direction Y. In addition, the first row L1 and the third row L3 of the sub pixels 131a and the sub pixels 131b respectively correspond to a same first transparent electrode 132, and the second row L2 and the fourth row L4 of the sub pixels 131a and the sub pixels 131b respectively correspond to a same second transparent electrode 133. Therefore, first transparent electrodes 132 and second transparent electrodes 133 form staggered arrangement in the second direction Y, and a gap G exists between the first transparent electrode 132 and the second transparent electrode 133, so that the first transparent electrode 132 and the second transparent electrode 133 are electrically isolated from each other and may provide independent voltages. The first transparent electrode 132 and the second transparent electrode 133 separately extend leftwards and rightwards in the first direction X, that is, the same row of sub pixels correspond to the same transparent electrode. In another embodiment, the first transparent electrodes 132 and the second transparent electrodes 133 is further the same as those in FIG. 6A. The first transparent electrodes 132 and the second transparent electrodes 133 are arranged in a staggered manner in the first direction X. That is, the adjacent transparent electrodes of a single first transparent electrode 132 in the first direction X are both the second transparent electrode 133. As can be seen from the foregoing embodiment, a quantity of sub pixels of which disposing positions correspond to a same transparent electrode is an even number, and both a quantity of sub pixels 131a and a quantity of sub pixels 131b of which disposing positions correspond to the same transparent electrode are the half of the quantity of the sub pixels. The reason is that the brightness formed by using the same quantity of sub pixels 131a and sub pixels 131b can achieve that in a particular area, a partial area has relatively high brightness, and another partial area has relatively low brightness, so that in the particular area, the brightness of the partial area and the brightness of the other partial area can compensate for each other and reach an average, to make overall display brightness even. When a transparent electrode is used as a unit, the same brightness is displayed in an area corresponding to each transparent electrode.

Figure 7B:
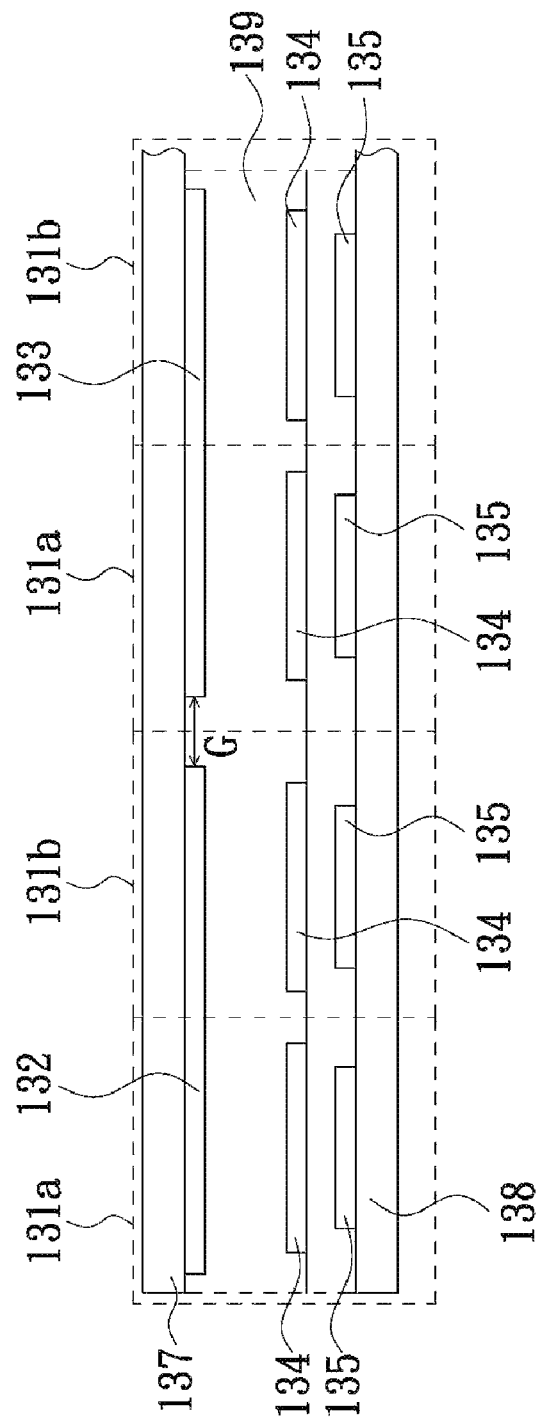
FIG. 7B is a schematic cross-sectional view illustrating the display panel according to the embodiment of the present invention along the dotted line AA in FIG. 7A.

FIG. 7B is a schematic cross-sectional view along the dotted line AA in FIG. 7A. The same reference numerals in FIG. 7B and FIG. 6B represent the same elements, and are no longer elaborated below. A difference between FIG. 7B and FIG. 6B lies in that in FIG. 7A, the first transparent electrode 132 and the second transparent electrode 133 both correspond to two sub pixels 131 in the second direction Y. Therefore, it is seen in FIG. 7B that the sub pixel 131a and the sub pixel 131b on the left side correspond to a same first transparent electrode 132, the sub pixel 131a and the sub pixel 131b on the right side correspond to a same second transparent electrode 133, and the gap G exists between the first transparent electrode 132 and the second transparent electrode 133. In summary, in the embodiment shown in FIG. 7A, for two adjacent sub pixels in the first direction X, positions of the two sub pixels correspond to a same transparent electrode. For example, positions of the adjacent sub pixel 131a and the sub pixel 131b in the first row L1 both correspond to the second transparent electrode 133. For two adjacent sub pixels in the second direction Y, positions of the two sub pixels correspond to a same transparent electrode or different transparent electrodes. Positions of two adjacent sub pixels in the first row L1 and in the third row L3 correspond to the second transparent electrode 132, and positions of two adjacent sub pixels in the third row L3 and the second row L2 respectively correspond to the second transparent electrode 132 and the third transparent electrode 133.

When the display panel 13 in FIG. 7A operates in the frame 1 or frame 2 shown in FIG. 3, is the same as that in FIG. 6A, the display panel 13 in FIG. 7A operates in a wide viewing angle mode, and the first transparent electrode 132 and the second transparent electrode 133 have the same voltage as a common voltage $V_{com}$, which are therefore no longer elaborated below. Next, the display panel 13 in FIG. 7A operates in the frame 3 or frame 4 shown in FIG. 3, that is, a narrow viewing angle mode is used as an example for description. The first transparent electrode 132 is coupled to a voltage $V_{CFcom11}$, the second transparent electrode 133 is coupled to a voltage $V_{CFcom21}$, and the second electrode 135 is coupled to the common voltage $V_{com1}$. During the frame 3, display brightness of the sub pixel 131a corresponding to the first transparent electrode 132 is higher than that of the sub pixel 131b corresponding to the first transparent electrode 132, and display brightness of the sub pixel 131a corresponding to the second transparent electrode 133 is lower than that of the sub pixel 131b corresponding to the second transparent electrode 133. During the frame 4, display brightness of the sub pixel 131a corresponding to the first transparent electrode 132 is higher than that of the sub pixel 131b corresponding to the first transparent electrode 132, and display brightness of the sub pixel 131a corresponding to the second transparent electrode 133 is lower than that of the sub pixel 131b corresponding to the second transparent electrode 133. In conclusion, in this embodiment, the sub pixel 131a and the sub pixel 131b that correspond to a same transparent electrode within a display time period of a frame display different brightness. Therefore, the adjacent of the sub pixel 131a and the sub pixel 131b that correspond to a same transparent electrode can average display brightness with each other. Eventually, for a plurality of transparent electrodes, display brightness corresponding to each single transparent electrode is the same, so that when the display panel 13 is in the narrow viewing angle mode, even display brightness is still maintained in areas in which different frames are displayed.

Figure 8A:
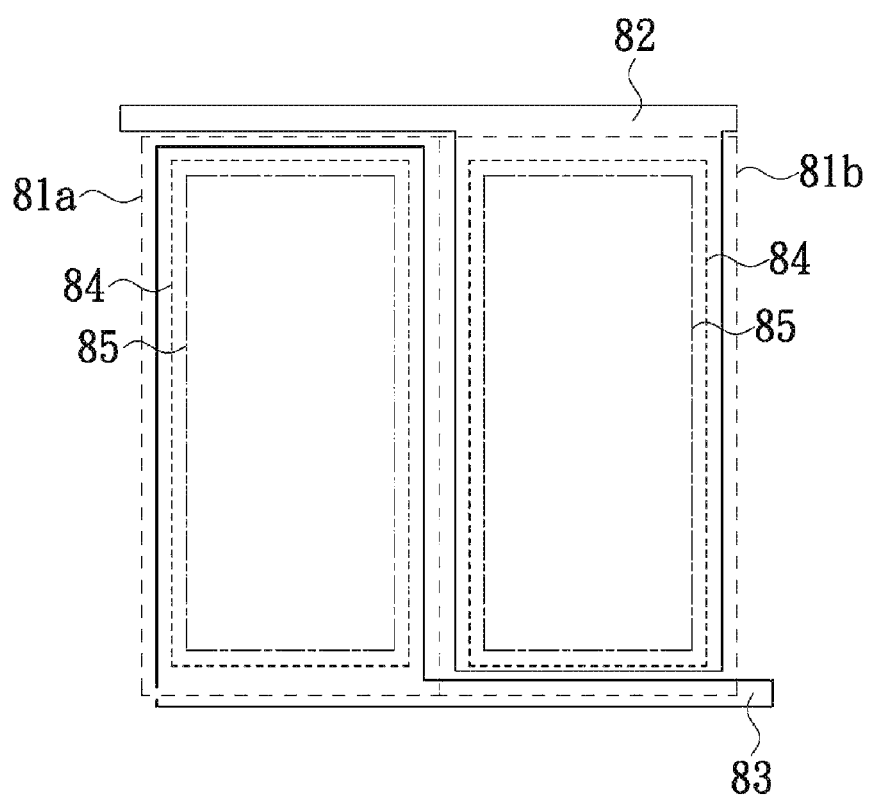
FIG. 8A is a schematic top view illustrating a electrode according to conventional technical art.
Figure 8B:
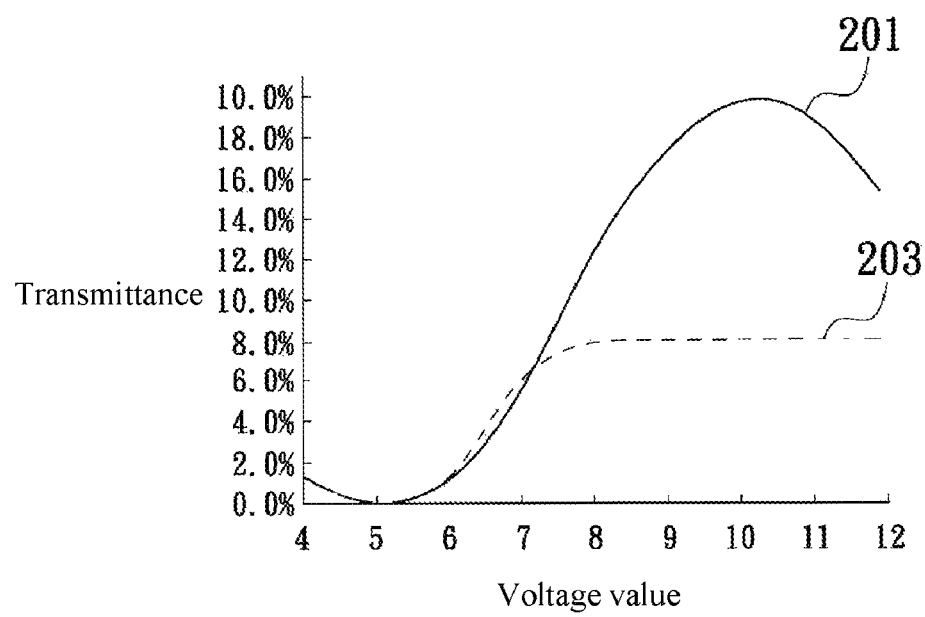
FIG. 8B is a schematic view of transmittance according to the embodiment of the FIG. 8A.

Refer to FIG. 8A. FIG. 8A is a schematic view of a conventional technical art. FIG. 8A is used for comparison with the embodiment of the present invention to further clearly describe the technical meaning. For example, a sub pixel 81a and a sub pixel 81b are configured in a display panel in FIG. 8A. The sub pixel 81a and the sub pixel 81b are adjacent to each other, and the sub pixel 81a and the sub pixel 81b separately have a first electrode 84 and a second electrode 85. The conventional display panel also has a first transparent electrode 82 and a second transparent electrode 83, wherein the sub pixel 81a corresponds to the second transparent electrode 83, and the sub pixel 81b corresponds to the first transparent electrode 82. Description is provided by using an example in which the sub pixel 131a receives a data voltage $V_{131a}$, the sub pixel 131b receives a data voltage $V_{131b}$, the first transparent electrode 132 receives a voltage $V_{CFcom11}$, the second transparent electrode 133 receives a voltage $V_{CFcom21}$, and the second electrode 135 receives a common voltage $V_{com1}$ in FIG. 8A. At a frame 1 and a frame 2, the display panel operates in a wide viewing angle mode. During the wide viewing angle mode, the first transparent electrode 132 and the second transparent electrode 133 have the same potentials and common voltages, and are no longer elaborated below. At a frame 3 and a frame 4, the display panel operates in a narrow viewing angle mode. That is, when the sub pixel 131a and the sub pixel 131b are in the frame 3 and the frame 4, brightness of a display picture is controlled by using adjusting a data voltage of each sub pixel and a voltage difference between voltages of transparent electrodes. As seen from the sub pixel 131a, a voltage difference between the data voltage $V_{131a}$ and the voltage $V_{CFcom21}$ at the frame 3 is greater than a voltage difference between the data voltage $V_{131a}$ and the voltage $V_{CFcom21}$ at the frame 4. Therefore, the brightness of the sub pixel 131a at the picture frame 3 is lower than the brightness at the picture frame 4. Similarly, as seen from the sub pixel 131b, a similar phenomenon may also be obtained. Therefore, when the conventional display panel 13 in FIG. 8A is in the narrow viewing angle mode, a display image has a phenomenon of uneven brightness. FIG. 8B shows transmittance of a single sub pixel 131 (the sub pixel 131a or the sub pixel 131b shown in FIG. 8A) of the conventional display panel 13 at different frames, wherein a horizontal axis is a voltage value obtained by deducting a common voltage from a data voltage, which is also referred to as a pixel potential, and a vertical axis is the transmittance. As shown in FIG. 8B, a curve 201 means transmittance that exists when a potential of a transparent electrode corresponding to the sub pixel 131 is greater than a common voltage, and a curve 203 means transmittance that exists when a potential of a transparent electrode corresponding to the sub pixel 131 is less than the common voltage. That is, the curve 201 and the curve 203 may be respectively regarded as transmittance of a single sub pixel at different frames. As can be clearly seen from FIG. 8B, when a pixel is in a higher potential, a single sub pixel has a larger transmittance difference at different frames, that is, display brightness is obviously uneven.

Figure 9:
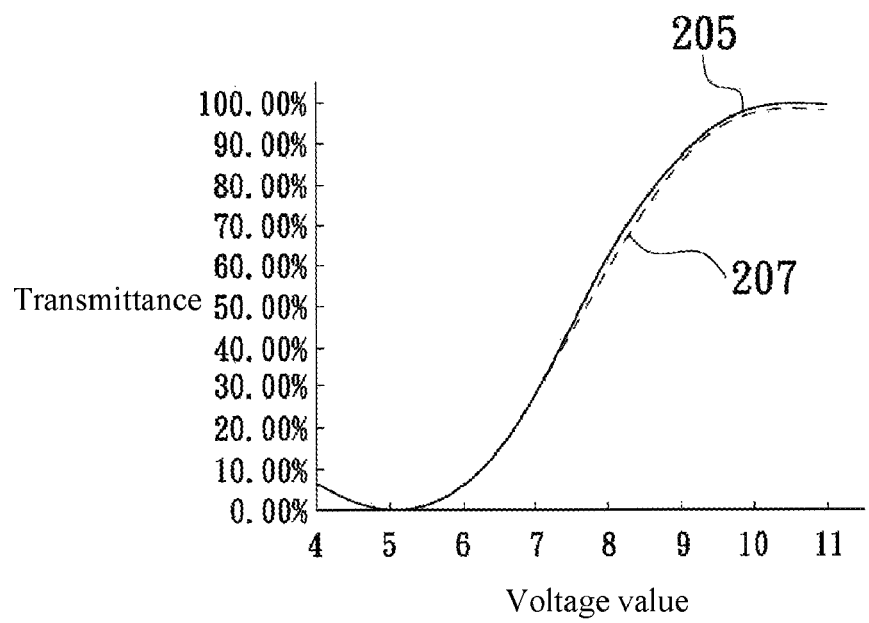
FIG. 9 is a schematic view of transmittance according to the embodiment of the present invention.

FIG. 9 shows transmittance of a single sub pixel 131 (the sub pixel 131a or the sub pixel 131b shown in FIG. 2A) according to the embodiment of the present invention at different frames, wherein a horizontal axis is a voltage value obtained by deducting a common voltage from a data voltage, which is also referred to as a pixel potential, and a vertical axis is transmittance. As shown in FIG. 9, a curve 205 is transmittance of the sub pixel at the frame 3, and a curve 207 is transmittance of the sub pixel at the frame 4. Therefore, it is clearly seen from FIG. 9 that transmittance differences of a single sub pixel at different frames are small, that is, the display panel 13 obviously has relatively even display brightness. The reason is that the single sub pixel 131 in the embodiment shown in FIG. 2A simultaneously corresponds to different transparent electrodes, that is, a brightness compensation effect is produced in the single sub pixel 131 to achieve brightness averaging. In view of this, for an overall display picture of the display panel 13, because a smallest unit is used to perform brightness averaging or compensation, even display brightness is provided at different picture frames. In addition, the embodiment in FIG. 2A further no load of an external control circuit is caused. The reason is that a quantity of sub pixels 131 each transparent electrode needs to correspond to is obviously less than that in other embodiments. Further, in the embodiment in FIG. 2A, the design of a transparent electrode not only is simple, but also can reduce an increase of a circuit resistance value of the transparent electrode, thereby effectively reducing a delay or distortion in voltage transfer.

In conclusion, for the display panel of the embodiment of the present invention, a configuration of a first transparent electrode and a second transparent electrode is used to enable a single sub pixel or a plurality of sub pixels 131 to simultaneously display different display brightness, and different display brightness is used to perform averaging to adjust display brightness. Therefore, the display panel still has even display brightness at different frames, thereby effectively improving viewing experience of consumers.

The present invention is disclosed through the foregoing embodiments; however, these embodiments are not intended to limit the present invention. Several changes and modifications made by persons skilled in the art without departing from the spirit and scope of the present invention shall fall within the protection scope of the present invention. The protection scope of the present invention is subject to the appended claims.

What is claimed is:

1. A display panel, comprising:
    a pair of substrates;
    a birefringent medium layer, sandwiched between the pair of substrates, wherein a plurality of sub pixels is defined on the pair of substrates;
    a pixel electrode, disposed above a first substrate of the pair of substrates for each sub pixel;
    a common electrode, disposed above the first substrate for each sub pixel, wherein one of the pixel electrode and the common electrode has a plurality of branches, each branch having a first section, a second section, and a connecting section connecting the first section to the second section;
    a first transparent electrode, disposed on an inner surface of a second substrate of the pair of substrates, wherein the first transparent electrode corresponds to one of the sub pixels, and a vertical projection of the first transparent electrode, a vertical projection of a part of the pixel electrode, and a vertical projection of a part of the common electrode are overlapped in the one of the sub pixels; and
    a second transparent electrode, disposed on the inner surface of the second substrate, wherein the second transparent electrode corresponds to the one of the sub pixels, and a vertical projection of the second transparent electrode, a vertical projection of another part of the pixel electrode, a vertical projection of another part of the common electrode are overlapped in the one of the sub pixels, and a gap exists between and separates the first transparent electrode and the second transparent electrode;
    wherein the connecting section overlaps and corresponds to the gap.

2. The display panel according to claim 1, wherein the first transparent electrode and the second transparent electrode both correspond to at least two adjacent sub pixels of the sub pixels, wherein the two adjacent sub pixels are arranged in a first direction, and the first transparent electrode and the second transparent electrode both extend along in the first direction.

3. The display panel according to claim 2, further comprises two pixel electrodes, wherein in a first frame, the two pixel electrodes in the two adjacent sub pixels have opposite polarities.

4. The display panel according to claim 1, wherein the first transparent electrode corresponds to at least two adjacent sub pixels of the sub pixels, and the second transparent electrode corresponds to the two adjacent sub pixels, wherein the two adjacent sub pixels are arranged in a first direction, the first transparent electrode and the second transparent electrode are arranged in a second direction, and the first direction and the second direction are staggered.

5. The display panel according to claim 4, wherein the first transparent electrode and the second transparent electrode arranged in a staggered manner along the second direction.

6. The display panel according to claim 4, further comprises two second transparent electrodes, wherein the first transparent electrode is located between the two second transparent electrodes.

7. The display panel according to claim 1, wherein in a first frame under a narrow viewing angle mode, the first transparent electrode has a first potential, the second transparent electrode has a second potential, and the common electrode has a third potential; and
    wherein the first potential, the second potential, and the third potential are different.

8. The display panel according to claim 7, wherein the first potential is greater than both the second potential and the third potential.

9. The display panel according to claim 8, wherein the first potential and the second potential differ by a first absolute potential difference, and the first potential and the third potential also differ by the first absolute potential difference.

10. The display panel according to claim 1, wherein in a first frame under a wide viewing angle mode, the first transparent electrode, the second transparent electrode, and the common electrode all have a first potential.

11. The display panel according to claim 1, wherein the connecting section includes a bending angle overlapping and corresponding to the gap such that a flowing current through the connecting section causes the connecting section to form an electric field direction different from those of the first section and the second section.

12. A display panel, comprising:
    a pair of substrates;
    a birefringent medium layer sandwiched between the pair of substrates, wherein a plurality of sub pixels is defined on the pair of substrates, and the plurality of sub pixels are arranged into a first row and a second row;
    a plurality of pixel electrodes, each disposed above a first substrate of the pair of substrates for a corresponding one of the plurality of sub pixels;
    a common electrode, disposed above the first substrate for each corresponding sub pixel, wherein one of the pixel electrode and the common electrode has a plurality of branches;
    a first transparent electrode, disposed on an inner surface of a second substrate of the pair of the substrates, wherein the first transparent electrode corresponds to a part of the sub pixels located in the first row, and a vertical projection of the first transparent electrode, a vertical projection of a first corresponding pixel electrode, and a vertical projection of the common electrode of the sub pixel overlap at least one of sub pixels located in the first row; and a second transparent electrode, disposed on the inner surface of the second substrate, wherein the second transparent electrode corresponds to a part of the sub pixels located in the second row, a vertical projection of the second transparent electrode, a vertical projection of a corresponding second pixel electrode, and a vertical projection of the common electrode overlap at least one of sub pixels located in the second row, and a separating gap exists between the first transparent electrode and the second transparent electrode, wherein the pixel electrodes for two adjacent sub pixels have opposite polarities;

wherein the first transparent electrode further corresponds to another part of the sub pixels located in the second row, and a vertical projection of the first transparent electrode, a vertical projection of the corresponding pixel electrode, and a vertical projection of the common electrode overlap in another part of the sub pixels located in the second row, wherein the second transparent electrode further corresponds to another part of the sub pixels located in the first row, and a vertical projection of the second transparent electrode, a vertical projection of the corresponding pixel electrode, and a vertical projection of the common electrode overlap in another part of the sub pixels located in the second row;

wherein the first transparent electrode is a pectinate-shaped electrode, and the first transparent electrode comprises two first electrode parts and a first wiring part, one of the first electrode parts corresponds to a part of the first row of the sub pixels, another of the first electrode parts corresponds to a part of the second row of the sub pixels, the two first electrodes parts are connected to each other through the first wiring part;

wherein the second transparent electrode is a pectinate-shaped electrode, and the second transparent electrode comprises two second electrode parts and a second wiring part, one of the second electrode parts corresponds to another part of the second row of the sub pixels, another of the second electrode parts corresponds to another part of the first row of the sub pixels, the two second electrode parts are connected to each other through the second wiring part;

wherein the first electrode parts and the second electrode parts are arranged in a staggered manner.

13. The display panel according to claim 12, wherein the plurality of sub pixels are further arranged into a third row and a fourth row, the third row is located between the first row and the second row, the second row is located between the third row and the fourth row, the first transparent electrode further corresponds to a part of the third row of the sub pixels, the second transparent electrode further corresponds to a part of the fourth row of the sub pixels, and the first transparent electrode and the second transparent electrode extend along a row direction, and are arranged in a column direction.

14. The display panel according to claim 12, wherein in a first frame under a narrow viewing angle mode, the first transparent electrode has a first potential, the second transparent electrode has a second potential, the common electrode has a third potential, and the first potential, the second potential, and the third potential are different.

15. The display panel according to claim 14, wherein the first potential is greater than both the second potential and the third potential.

16. The display panel according to claim 14, wherein the first potential and the second potential differ by a first absolute potential difference, and the first potential and the third potential also differ by the first absolute potential difference.

17. The display panel according to claim 12, wherein in a first frame under a wide viewing angle mode, the first transparent electrode, the second transparent electrode, and the common electrode all have a first potential.

18. The display panel according to claim 12, wherein each branch has a first section, a second section, and a connecting section connecting the first section to the second section.

19. A display panel, comprising:

a pair of substrates;

a birefringent medium layer sandwiched between the pair of substrates, wherein a plurality of sub pixels is defined on the pair of substrates, and the plurality of sub pixels are arranged into a first row and a second row;

a plurality of pixel electrodes, each disposed above a first substrate of the pair of substrates for a corresponding one of the plurality of sub pixels;

a common electrode, disposed above the first substrate for each corresponding sub pixel, wherein one of the pixel electrode and the common electrode has a plurality of branches;

a first transparent electrode, disposed on an inner surface of a second substrate of the pair of the substrates, wherein the first transparent electrode corresponds to a part of the sub pixels located in the first row, and a vertical projection of the first transparent electrode, a vertical projection of a first corresponding pixel electrode, and a vertical projection of the common electrode of the sub pixel overlap at least one of sub pixels located in the first row; and a second transparent electrode, disposed on the inner surface of the second substrate, wherein the second transparent electrode corresponds to a part of the sub pixels located in the second row, a vertical projection of the second transparent electrode, a vertical projection of a corresponding second pixel electrode, and a vertical projection of the common electrode overlap at least one of sub pixels located in the second row, and a separating gap exists between the first transparent electrode and the second transparent electrode, wherein the pixel electrodes for two adjacent sub pixels have opposite polarities;

wherein the plurality of sub pixels are further arranged into a third row and a fourth row, the third row is located between the first row and the second row, the second row is located between the third row and the fourth row, the first transparent electrode further corresponds to a part of the third row of the sub pixels, the second transparent electrode further corresponds to a part of the fourth row of the sub pixels, and the first transparent electrode and the second transparent electrode extend along a row direction, and are arranged in a column direction.

* * * * *